US012293709B2

(12) United States Patent
Zhang et al.

(10) Patent No.: US 12,293,709 B2
(45) Date of Patent: May 6, 2025

(54) PIXEL CIRCUIT AND DRIVING METHOD FOR SAME, DISPLAY PANEL, AND DISPLAY APPARATUS

(71) Applicants: WUHAN TIANMA MICROELECTRONICS CO., LTD., Wuhan (CN); Wuhan Tianma Microelectronics Co., Ltd. Shanghai Branch, Shanghai (CN)

(72) Inventors: Mengmeng Zhang, Wuhan (CN); Jing Huang, Shanghai (CN)

(73) Assignees: WUHAN TIANMA MICROELECTRONICS CO., LTD., Wuhan (CN); WUHAN TIANMA MICROELECTRONICS CO., LTD. Shanghai Branch, Shanghai (CN)

( * ) Notice: Subject to any disclaimer, the term of this patent is extended or adjusted under 35 U.S.C. 154(b) by 0 days.

(21) Appl. No.: 17/692,664

(22) Filed: Mar. 11, 2022

(65) Prior Publication Data

US 2022/0199024 A1 Jun. 23, 2022

(30) Foreign Application Priority Data

Nov. 29, 2021 (CN) ......................... 202111431600.X

(51) Int. Cl.
*G09G 3/3233* (2016.01)

(52) U.S. Cl.
CPC ..... *G09G 3/3233* (2013.01); *G09G 2310/061* (2013.01); *G09G 2310/08* (2013.01);
(Continued)

(58) Field of Classification Search
CPC ........... G09G 3/3233; G09G 2310/061; G09G 2310/08; G09G 2320/0214;
(Continued)

(56) References Cited

U.S. PATENT DOCUMENTS

2016/0372037 A1* 12/2016 Lim .................... H01L 27/3265
2018/0033370 A1* 2/2018 Zheng .................. G09G 3/3233
(Continued)

FOREIGN PATENT DOCUMENTS

CN 110085170 A 8/2019
CN 111489701 A 8/2020
(Continued)

OTHER PUBLICATIONS

State Intellectual Property Office of the People's Republic of China, First Office Action, Chinese Patent Application No. 202111431600.X, Mailed Jul. 14, 2022, 36 pages.

*Primary Examiner* — Jeff Piziali
(74) *Attorney, Agent, or Firm* — Christensen O'Connor Johnson Kindness PLLC

(57) ABSTRACT

Present disclosure provide a pixel circuit and a driving method, a display panel, and a display apparatus. The pixel circuit includes: a driving transistor, a gate connected to a first node, a first electrode connected to a second node, a second electrode connected to a third node; a control module, connected to the first node and including a first unit and a second unit that are connected in series, an intermediate node arranged between first unit and second unit; a voltage regulation module, wherein a driving cycle of the pixel circuit includes a writing frame and holding frame, the writing frame includes a first non-light-emission period, the holding frame includes a second non-light-emission period, and the voltage regulation module is configured to adjust, in the second non-light-emission periods in holding frame, a voltage of intermediate node electrically connected thereto to a first voltage.

6 Claims, 10 Drawing Sheets

(52) U.S. Cl.
CPC ............... *G09G 2320/0214* (2013.01); *G09G 2320/0247* (2013.01)

(58) Field of Classification Search
CPC ... G09G 2320/0247; G09G 2300/0819; G09G 2300/0842; G09G 2300/0861; G09G 2310/0251; G09G 2310/0262
See application file for complete search history.

(56) References Cited

U.S. PATENT DOCUMENTS

| | | | | |
|---|---|---|---|---|
| 2020/0126478 | A1* | 4/2020 | Lee | G09G 3/325 |
| 2021/0125559 | A1* | 4/2021 | Park | G09G 3/3258 |
| 2021/0407419 | A1* | 12/2021 | Li | G09G 3/3266 |
| 2022/0051625 | A1* | 2/2022 | Lai | G09G 3/3233 |
| 2022/0148502 | A1* | 5/2022 | Kim | H01L 27/3265 |
| 2022/0180819 | A1* | 6/2022 | Ono | G09G 3/3266 |

FOREIGN PATENT DOCUMENTS

| | | | | | |
|---|---|---|---|---|---|
| CN | 111613177 | A | * | 9/2020 | G09G 3/3208 |
| CN | 111710299 | A | * | 9/2020 | G09G 3/3225 |
| CN | 111816119 | A | * | 10/2020 | G09G 3/3225 |
| CN | 112382235 | A | | 2/2021 | |
| CN | 113192460 | A | * | 7/2021 | G09G 3/3208 |
| CN | 113314074 | A | | 8/2021 | |

* cited by examiner

PIXEL CIRCUIT AND DRIVING METHOD FOR SAME, DISPLAY PANEL, AND DISPLAY APPARATUS

CROSS REFERENCE TO RELATED APPLICATIONS

This application is a continuation of 202111431600.X, filed on Nov. 29, 2021, the content of which is hereby incorporated by reference.

TECHNICAL FIELD

The present disclosure relates to the technical field of display, and in particular, to a pixel circuit and a driving method for same, a display panel, and a display apparatus.

BACKGROUND

An organic light emitting diode (OLED) display panel includes a plurality of pixel circuits arranged in a matrix, with a plurality of transistors arranged in each pixel circuit. Based on the coordination of the transistors, the pixel circuit transmits a driving current to a light-emitting element to drive the light-emitting element to emit light.

However, due to an off-state leakage current of the transistors, some nodes in the pixel circuit have serious electric leakage, causing the driving current transmitted by the pixel circuit to deviate from a standard value thereof, which in turn causes a brightness deviation of the light-emitting element, resulting in flickering and other undesirable phenomena in the display panel.

SUMMARY

Accordingly, embodiments of the present disclosure provide a pixel circuit and a driving method for same, a display panel, and a display apparatus, which can effectively alleviate the problem of picture flickering.

According to one aspect, an embodiment of the present disclosure provides a pixel circuit, including:

- a driving transistor, a gate of the driving transistor being electrically connected to a first node, a first electrode of the driving transistor being electrically connected to a second node, and a second electrode of the driving transistor being electrically connected to a third node;
- at least one control module, electrically connected to the first node and configured to write a voltage into the first node, each control module including a first unit and a second unit connected in series, and an intermediate node being arranged between the first unit and the second unit; and
- a voltage regulation module, electrically connected to at least one intermediate node of the control module;
- wherein a driving cycle of the pixel circuit includes a writing frame and at least one holding frame, the writing frame includes a first non-light-emission period, the holding frame includes a second non-light-emission period, and the voltage regulation module is configured to adjust, in the second non-light-emission periods in at least some of the holding frames, a voltage of each intermediate node electrically connected thereto to a first voltage, wherein $|V-V_{N1}|<\Delta V$, V is the first voltage, $V_{N1}$ is the voltage of the first node, and $\Delta V$ is a preset voltage difference.

According to another aspect, an embodiment of the present disclosure provides a diving method for a pixel circuit, wherein the pixel circuit includes:

- a driving transistor, a gate of the driving transistor being electrically connected to a first node, a first electrode of the driving transistor being electrically connected to a second node, and a second electrode of the driving transistor being electrically connected to a third node;
- at least one control module, electrically connected to the first node and configured to write a voltage into the first node, each control module including a first unit and a second unit connected in series, and an intermediate node being arranged between the first unit and the second unit; and
- a voltage regulation module, including a capacitance regulation unit, wherein a first terminal of the capacitance regulation unit receives a first signal, and a second terminal of the capacitance regulation unit is electrically connected to at least one intermediate node;
- wherein a driving cycle of the pixel circuit includes a writing frame and at least one holding frame, the writing frame includes a first non-light-emission period, and the holding frame includes a second non-light-emission period; the driving method includes:
- in the second non-light-emission periods in at least some of the holding frames, adjusting, by the capacitance regulation unit by using a jump of the first signal between an enable level and a non-enable level, a voltage of each intermediate node electrically connected thereto to a first voltage, wherein $|V-V_{N1}|<\Delta V$, V is the first voltage, $V_{N1}$ is a voltage of the first node, and $\Delta V$ is a preset voltage difference.

According to another aspect, an embodiment of the present disclosure provides a diving method for a pixel circuit, wherein the pixel circuit includes:

- a driving transistor, a gate of the driving transistor being electrically connected to a first node, a first electrode of the driving transistor being electrically connected to a second node, and a second electrode of the driving transistor being electrically connected to a third node;
- at least one control module, electrically connected to the first node and configured to write a voltage into the first node, each control module including a first unit and a second unit connected in series, and an intermediate node being arranged between the first unit and the second unit; and
- a voltage regulation module, including a switch regulation unit, wherein a first terminal of the switch regulation unit receives the first voltage, and a second terminal of the switch regulation unit is electrically connected to at least one intermediate node;
- wherein a driving cycle of the pixel circuit includes a writing frame and at least one holding frame, the writing frame includes a first non-light-emission period, and the holding frame includes a second non-light-emission period; the driving method includes:
- in the second non-light-emission periods in at least some of the holding frames, writing, by the switch regulation unit, the first voltage into each intermediate node electrically connected thereto, wherein $|V-V_{N1}|<\Delta V$, V is the first voltage, $V_{N1}$ is a voltage of the first node, and $\Delta V$ is a preset voltage difference.

According to further another aspect, an embodiment of the present disclosure provides a display panel, including the pixel circuit described above.

According to further another aspect, an embodiment of the present disclosure provides a display apparatus, including the display panel described above.

BRIEF DESCRIPTION OF DRAWINGS

To describe the technical solutions in the embodiments of the present disclosure more clearly, the following briefly describes the accompanying drawings required to be used in the embodiments. The accompanying drawings in the following description show merely some embodiments of the present disclosure, and a person of ordinary skill in the art may still derive other drawings from these accompanying drawings.

DETAILED DESCRIPTION

For the sake of a better understanding of the technical solutions of the present disclosure, the embodiments of the present disclosure are described in detail below with reference to the accompanying drawings.

It should be noted that the embodiments in the following descriptions are only a part rather than all of the embodiments in the present disclosure. All other embodiments obtained by those ordinarily skilled in the art based on the embodiments of the present disclosure without creative efforts should also fall within the protection scope of the present disclosure.

Terms in the embodiments of the present disclosure are merely used to describe the specific embodiments, and are not intended to limit the present disclosure. Unless otherwise specified in the context, words, such as "a", "the", and "this", in a singular form in the embodiments of the present disclosure and the appended claims include plural forms.

It should be understood that the term "and/or" in this specification merely describes associations between associated objects, and it indicates three types of relationships. For example, A and/or B may indicate that A exists alone, A and B coexist, or B exists alone. In addition, the character "/" in this specification generally indicates that the associated objects are in an "or" relationship.

Figure 1:
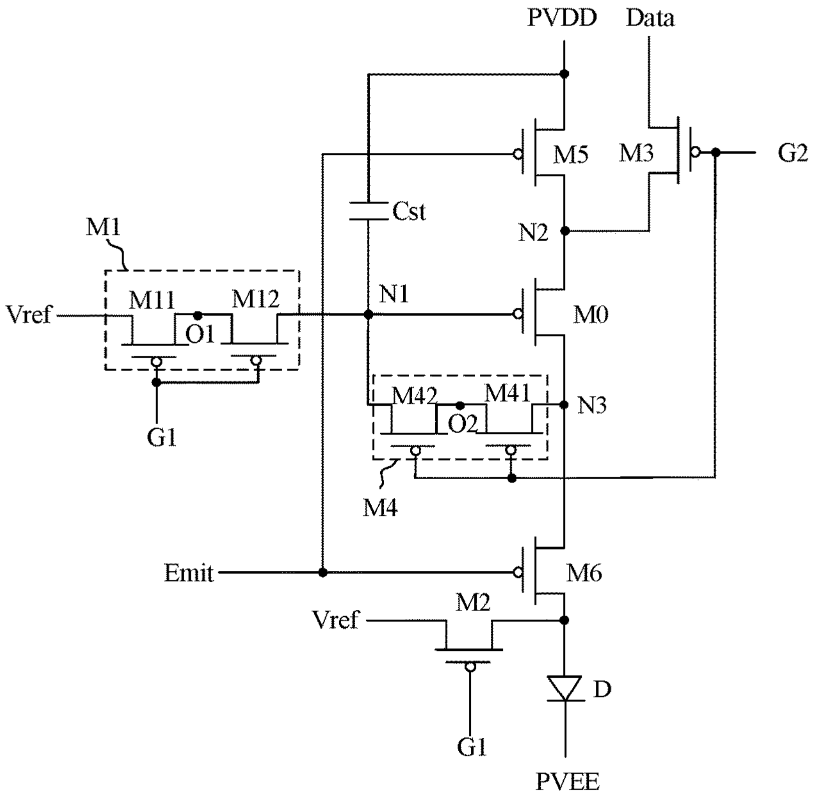
FIG. 1 is a schematic structural diagram of a pixel circuit according to an embodiment of the present disclosure.

To illustrate the problem in the prior art and the technical solutions provided by the present disclosure more clearly, using the pixel circuit shown in FIG. 1 as an example, the present disclosure first describes the operation principle of the pixel circuit as follows:

FIG. 1 is a schematic structural diagram of a pixel circuit according to an embodiment of the present disclosure. As shown in FIG. 1, the pixel circuit includes a driving transistor M0, a gate reset transistor M1, an anode reset transistor M2, a data writing transistor M3, a threshold compensation transistor M4, a first light-emitting control transistor M5, a second light-emitting control transistor M6, and a storage capacitor Cst.

A gate of the driving transistor M0 is electrically connected to a first node N1, a first electrode of the driving transistor M0 is electrically connected to a second node N2, and a second electrode of the driving transistor M0 is electrically connected to a third node N3.

The gate reset transistor M1 is a double-gate transistor. The gate reset transistor M1 includes a first reset transistor M11 and a second reset transistor M12 that are connected in series. A gate of the first reset transistor M11 and a gate of the second reset transistor M12 are electrically connected to a first gate signal line G1, a first electrode of the first reset transistor M11 is electrically connected to a reset signal line Vref, a second electrode of the first reset transistor M11 and a first electrode of the second reset transistor M12 are electrically connected to a first intermediate node O1, and a second electrode of the second reset transistor M12 is electrically connected to the first node N1.

A gate of the anode reset transistor M2 is electrically connected to the first gate signal line G1, a first electrode of the anode reset transistor M2 is electrically connected to the reset signal line Vref, and a second electrode of the anode reset transistor M2 is electrically connected to an anode of a light-emitting element D.

A gate of the data writing transistor M3 is electrically connected to a second gate signal line G2, a first electrode of the data writing transistor M3 is electrically connected to a data line Data, and a second electrode of the data writing transistor M3 is electrically connected to the second node N2.

The threshold compensation transistor M4 is a double-gate transistor. The threshold compensation transistor M4 includes a first sub-compensation transistor M41 and a second sub-compensation transistor M42 that are connected in series. A gate of the first sub-compensation transistor M41 and a gate of the second sub-compensation transistor M42 are electrically connected to the second gate signal line G2, a first electrode of the first sub-compensation transistor M41 is electrically connected to the third node N3, a second electrode of the first sub-compensation transistor M41 and a first electrode of the second sub-compensation transistor M42 are electrically connected to a second intermediate node O2, and a second electrode of the second sub-compensation transistor M42 is electrically connected to the first node N1.

A gate of the first light-emitting control transistor M5 is electrically connected to a light-emitting control signal line Emit, a first electrode of the first light-emitting control transistor M5 is electrically connected to a power signal line PVDD, and a second electrode of the first light-emitting control transistor M5 is electrically connected to the second node N2.

A gate of the second light-emitting control transistor M6 is electrically connected to the light-emitting control signal line Emit, a first electrode of the second light-emitting control transistor M6 is electrically connected to the third node N3, and a second electrode of the second light-emitting control transistor M6 is electrically connected to the anode of the light-emitting element D.

A first electrode of the storage capacitor Cst is electrically connected to the power signal line PVDD, and a second electrode of the storage capacitor Cst is electrically connected to the first node N1.

Figure 2:
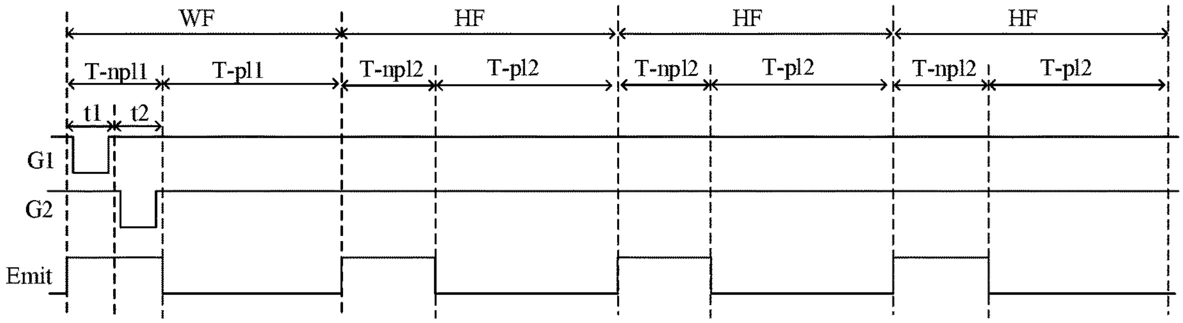
FIG. 2 is a sequence diagram corresponding to FIG. 1.

FIG. 2 is a sequence diagram corresponding to FIG. 1. As shown in FIG. 2, a driving cycle of the pixel circuit includes one writing frame WF and at least one holding frame HF. The pixel circuit writes a data voltage only in the writing frame WF. In the holding frame HF, the pixel circuit does not write the data voltage but only holds the data voltage. The writing frame WF includes a first non-light-emission period T-npl1 and a first light-emission period T-pl1; each holding frame HF includes a second non-light-emission period T-npl2 and a second light-emission period T-pl2; the first non-light-emission period T-npl1 includes a reset period t1 and a charging period t2.

In the foregoing example, the transistors are all P-type transistors, and enable levels of the first gate signal line G1, the second gate signal line G2, and the light-emitting control signal line Emit are all low levels. In the reset period t1, the first gate signal line G1 provides a low level; the first reset transistor M11, the second reset transistor M12, and the anode reset transistor M2 are turned on under the effect of the low level, and the gate of the driving transistor M0 and the anode of the light-emitting element D by using a reset voltage $V_{ref}$. In this case, $V_{N1}=V_{ref}$.

In the charging period t2, the second gate signal line G2 provides a low level; the data writing transistor M3, the first sub-compensation transistor M41, and the second sub-compensation transistor M42 are turned on under the effect of the low level to write he data voltage and compensate a threshold voltage of the driving transistor M0. In this case, $V_{N1}=V_{N3}=V_{Data}-V_{th}$, and $V_{N2}=V_{Data}$, wherein $V_{th}$ is the threshold voltage of the driving transistor M0.

In the first light-emission period T-pl1 and the second light-emission period T-pl2, the light-emitting control signal line Emit provides a low level; the first light-emitting control transistor M5 and the second light-emitting control transistor M6 are turned on under the effect of the low level, to convert a driving current obtained through conversion by the driving transistor M0 to the anode of the light-emitting element D, to drive the light-emitting element D to emit light. In this case, $V_{N1}=V_{Data}-V_{th}$, $V_{N2}=V_{PVDD}$, and $V_{N3}=V_{PVEE}+V_{OLED}$, wherein $V_{PVEE}$ is a cathode voltage of the light-emitting element D, and $V_{OLED}$ is a voltage difference between the anode and cathode of the light-emitting element D.

In may be understood that, the value of the driving current generated by the pixel circuit depends on the value of the gate-source voltage Vgs of the driving transistor M0 in the light-emission period. With a smaller gate-source voltage Vgs of the driving transistor M0, the driving transistor M0 is turned on more completely, and the driving current flowing into the light-emitting element D is larger.

As can be understood from the above analysis, in the holding frame HF, the potential of the first node N1 is merely held by using the storage capacitor Cst, and the data voltage is not written into the first node N1 again. In the related art, in the second light-emission period T-lp2, the first intermediate node O1 and the second intermediate node O2 are in the suspended state. Affected by the off-state leakage current of the transistor, the low potential of the reset signal line Vref flows to the first intermediate node O1, and the low potential of the third node N3 flows to the second intermediate node O2. That is, the first intermediate node O1 and the second intermediate node O2 leak electricity to the reset signal line Vref and the third node N3 respectively, thereby pulling down the potential of the first intermediate node O1 and the potential of the second intermediate node O2. Therefore, the low potential further flows to the first node N1, causing the first node N1 to leak electricity to the first intermediate node O1 and the second intermediate node O2, and the potential of the first node N1 is also pulled down. In other words, the gate potential of the driving transistor M0 is pulled down. In this case, the gate-source voltage Vgs of the driving transistor M0 is reduced, and the driving current flowing into the light-emitting element D rises, resulting in higher screen brightness and screen flickering.

Particularly, for a wearable display panel, a display mode of the display panel includes a normal mode and an idle mode. In the idle mode, the display panel is generally refreshed at a relatively low frequency. For example, the refresh frequency of the display panel in the idle mode is only 5 Hz. Compared with high-frequency driving, the low-frequency driving has a longer holding frame HF; correspondingly, the leakage time of the first node N1 is longer, causing the potential thereof to be pulled down to a lower value and resulting in more severe flickering. Moreover, when the display panel is in an environment with sunlight, the off-state leakage current of the transistor is increased, which further aggravates the flickering.

To solve the foregoing problem, the embodiments of the present disclosure provide a pixel circuit. The pixel circuit can effectively alleviate the problem of screen flickering caused by the leakage current of the first node.

Figure 3:
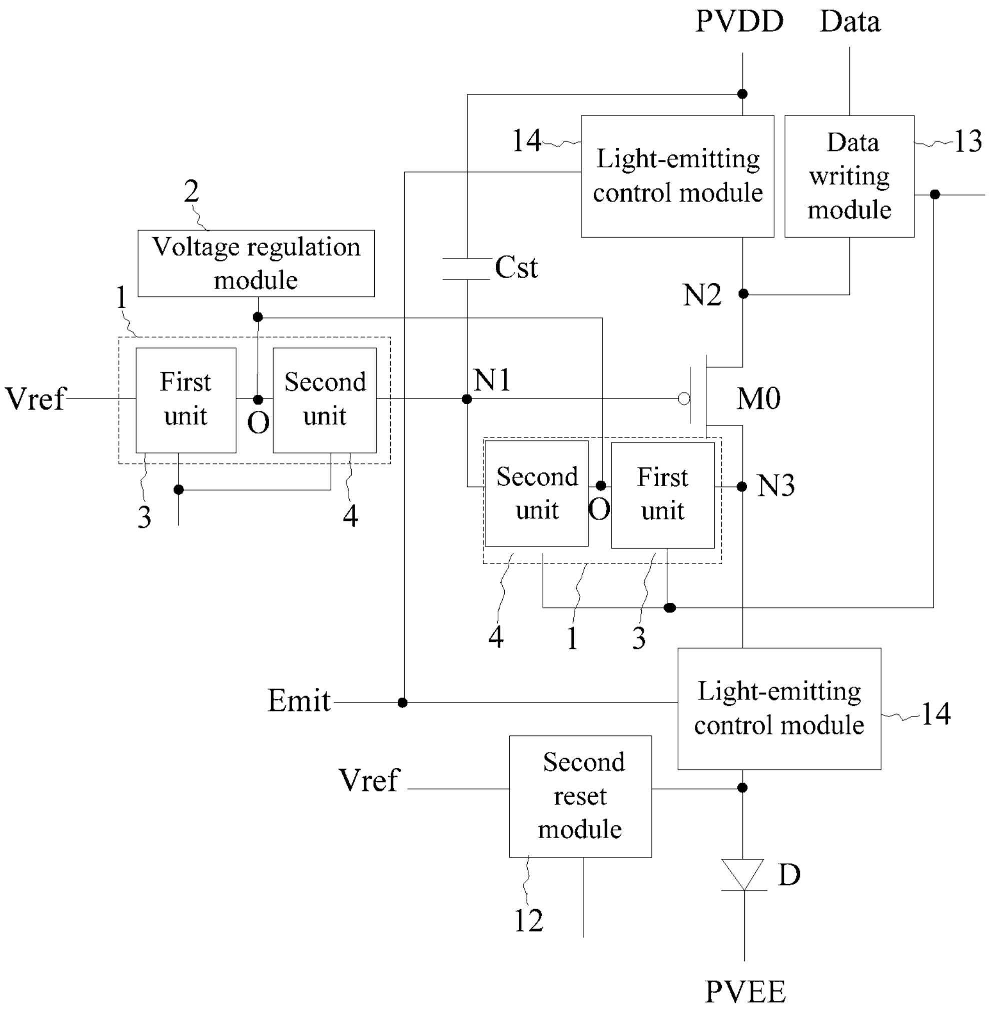
FIG. 3 is a schematic structural diagram of a pixel circuit according to an embodiment of the present disclosure.

FIG. 3 is a schematic structural diagram of a pixel circuit according to an embodiment of the present disclosure. As shown in FIG. 3, the pixel circuit includes a driving transistor M0, at least one control module 1, and a voltage regulation module 2.

A gate of the driving transistor M0 is electrically connected to a first node N1, a first electrode of the driving transistor M0 is electrically connected to a second node N2, and a second electrode of the driving transistor M0 is electrically connected to a third node N3. Each control module 1 is electrically connected to the first node N1 and configured to write a voltage into the first node N1. The control module 1 includes a first unit 3 and a second unit 4 that are connected in series, and an intermediate node O is arranged between the first unit 3 and the second unit 4. The voltage regulation module 2 is electrically connected to the intermediate nodes O of at least some of the control modules 1.

Figure 6:
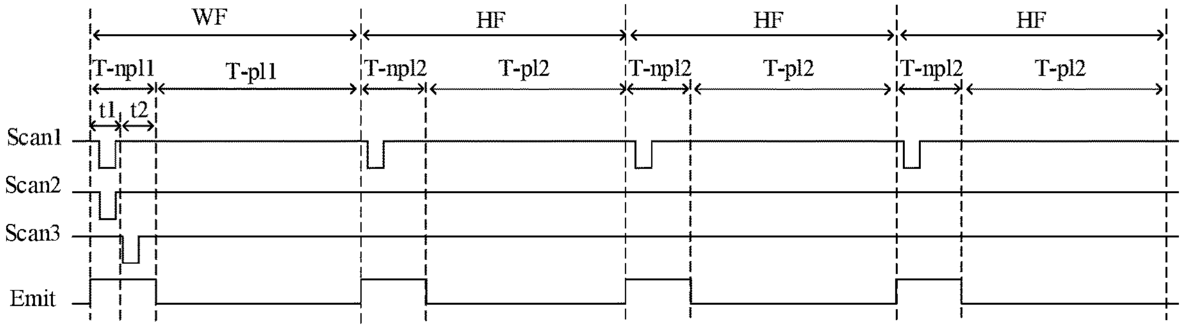
FIG. 6 is a sequence diagram corresponding to FIG. 4 and FIG. 5.

With reference to FIG. 6, a driving cycle of the pixel circuit includes one writing frame WF and at least one holding frame HF. The writing frame WF includes a first non-light-emission period T-npl1, and each holding frame HF includes a second non-light-emission period T-npl2. The voltage regulation module 2 is configured to adjust a voltage of each intermediate node O electrically connected thereto to a first voltage in the second non-light-emission periods T-npl2 in at least some of the holding frames HF, wherein $|V-V_{N1}|<\Delta V$, V is the first voltage, $V_{N1}$ is a voltage of the first node N1, and ΔV is a preset voltage difference. With reference to the above analysis on the operation principle of the pixel circuit, $V_{N1}=V_{Data}-V_{th}$.

In should be noted that, in the embodiments of the present disclosure, that stating that two structures are electrically connected means that the two structures are electrically connected in a direct connection manner. For example, stating that the control module 1 and the first node N1 are electrically connected means that the control module 1 and the first node N1 are directly connected.

In the embodiments of the present disclosure, by setting the voltage regulation module 2, the voltage of each intermediate node O electrically connected thereto can be adjusted to the first voltage by the voltage regulation module 2 in the second non-light-emission periods T-npl2 in at least some of the holding frames HF, so that such intermediate nodes O are reset at a high frequency, and the potential of such intermediate nodes O is pulled up, thereby maintaining the voltage difference between the intermediate node O and the first node N1 within the range of the preset voltage difference ΔV. In this way, the voltage difference between the intermediate node O and the first node N1 is reduced, thereby reducing the electric leakage from the first node N1 to the intermediate node O in the holding frame, so that the potential of the gate of the driving transistor M0 is maintained at $V_{Data}-V_{th}$, and thus the driving current obtained through conversion by the driving transistor M0 is closer to a standard current. That is, even in the case of low-frequency driving, the present disclosure can effectively solve the problem of screen flickering due to an increase in the driving current and optimization of the display effect.

In an implementation, to make the voltage of the intermediate node O after the regulation closer to the voltage of the first node N1, ΔV may satisfy the following condition: $\Delta V \leq 0.5V$.

In an implementation, to reset the intermediate node O at a higher frequency, the voltage regulation module 2 adjusts the voltage of the intermediate node O electrically connected thereto to the first voltage in the second non-light-emission period T-npl2 in each holding frame HF.

Figure 4:
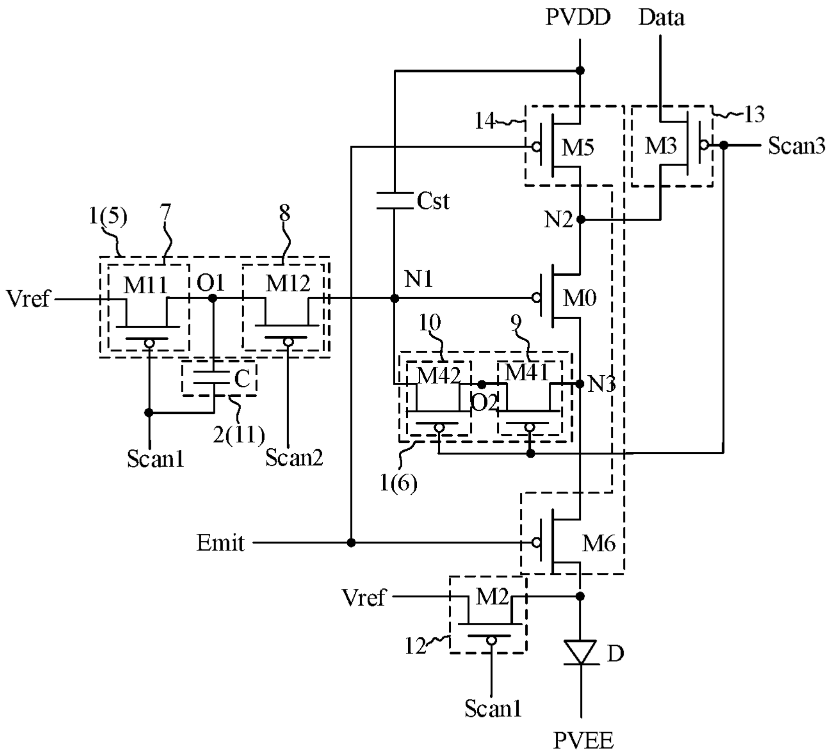
FIG. 4 is another schematic structural diagram of a pixel circuit according to an embodiment of the present disclosure.

In an implementation, FIG. 4 is another schematic structural diagram of a pixel circuit according to an embodiment of the present disclosure. As shown in FIG. 4, the at least one control module 1 includes a first reset module 5 and a threshold compensation module 6.

The first reset module 5 is electrically connected between a reset signal line Vref and the first node N1. The first reset module 5 includes a first reset unit 7 and a second reset unit 8 that are connected in series, and a first intermediate node O1 is arranged between the first reset unit 7 and the second reset unit 8. The threshold compensation module 6 is electrically connected between the third node N3 and the first node N1. The threshold compensation module 6 includes a first compensation unit 9 and a second compensation unit 10 that are connected in series, and a second intermediate node O2 is arranged between the first compensation unit 9 and the second compensation unit 10. The voltage regulation module 2 is electrically connected to the first intermediate node O1 and/or second intermediate node O2.

It may be understood that the first voltage is used for pulling the potential of the first intermediate node O1 and/or the second intermediate node O2 to be close to the voltage of the first node N1. Therefore, the first voltage is higher than the reset voltage $V_{ref}$ and a node voltage $V_{N3}$ of the third node N3 ($V_{N3}=V_{PVEE}+V_{OLED}$).

Based on the foregoing configuration, the voltage regulation module 2 resets the first intermediate node O1 and/or the second intermediate node O2 at a high frequency, so that the voltage thereof is adjusted to the first voltage in the second non-light-emission period T-npl2, to reduce the voltage difference between the first intermediate node O1 and/or the second intermediate node O2 and the first node N1 and to reduce the electric leakage of the first node N1 to the two intermediate nodes, thereby avoiding the problem of an increase in the screen brightness caused by the reduced potential of the first node N1.

In an implementation, referring to FIG. 4, FIG. 5, FIG. 9 and FIG. 10, the voltage regulation module 2 includes a capacitance regulation unit 11, wherein a first terminal of the capacitance regulation unit 11 receives a first signal, and a second terminal of the capacitance regulation unit 11 is electrically connected to the first intermediate node O1 and/or the second intermediate node O2. Specifically, referring to FIG. 4 again, the second terminal of the capacitance regulation unit 11 is electrically connected to the first intermediate node O1; or referring to FIG. 9 again, the second terminal of the capacitance regulation unit 11 is electrically connected to the second intermediate node O2; or referring to FIG. 5 and FIG. 10 again, the second terminal of the capacitance regulation unit 11 is electrically connected to the first intermediate node O1 and the second intermediate node O2.

In the second non-light-emission periods T-npl2 in at least some of the holding frames HF, the first signal jumps between an enable level and a non-enable level, and the capacitance regulation unit 11 is configured to adjust a voltage of the first intermediate node O1 and/or the second intermediate node O2 electrically connected thereto to the first voltage by using the jump of the first signal.

Specifically, in the second non-light-emission period T-npl2, the first signal jumps from an enable level (low level) to a non-enable level (high level), to pull up the voltage of the first terminal of the capacitance regulation unit 11, and the voltage jump of the first terminal further causes a voltage jump of the second terminal, so that the voltage of the second terminal is also pulled up, thereby adjusting the voltage of the first intermediate node O1 and/or the second intermediate node O2 connected to the second terminal to the first voltage.

Further, referring to FIG. 4, FIG. 5, FIG. 9 and FIG. 10, the capacitance regulation unit 11 includes a regulation capacitor C, wherein a first electrode of the regulation capacitor C receives a first signal, and a second electrode of the regulation capacitor C is electrically connected to the first intermediate node O1 and/or the second intermediate node O2.

Based on the characteristic of maintaining a constant voltage difference between both ends of the capacitor, when the first signal received by the first electrode of the regulation capacitor C jumps, the jump causes the voltage of the second electrode of the regulation capacitor C to change, thereby pulling up the potential of the first intermediate node O1 and/or the second intermediate node O2 electrically connected to the second electrode.

In an implementation, referring to FIG. 4 again, the first reset unit 7 is electrically connected between the reset signal line Vref and the first intermediate node O1; the first reset unit 7 is further electrically connected to a first scanning signal line Scan1 and configured to write the reset voltage into the first intermediate node O1 in response to an enable level of the first scanning signal. The second reset unit 8 is electrically connected between the first intermediate node O1 and the first node N1; the second reset unit 8 is further electrically connected to a second scanning signal line Scan2 and configured to write the voltage of the first intermediate node O1 into the first node N1 in response to an enable level of a second scanning signal.

On this basis, the regulation capacitor C is electrically connected to the first scanning signal line Scan1. Referring to FIG. 4 again, the second electrode of the regulation capacitor C is electrically connected to the first intermediate node O1. Alternatively, FIG. 5 is further another schematic structural diagram of a pixel circuit according to an embodiment of the present disclosure; as shown in FIG. 5, the second electrode of the regulation capacitor C is electrically connected to the first intermediate node O1 and the second intermediate node O2.

Figure 5:
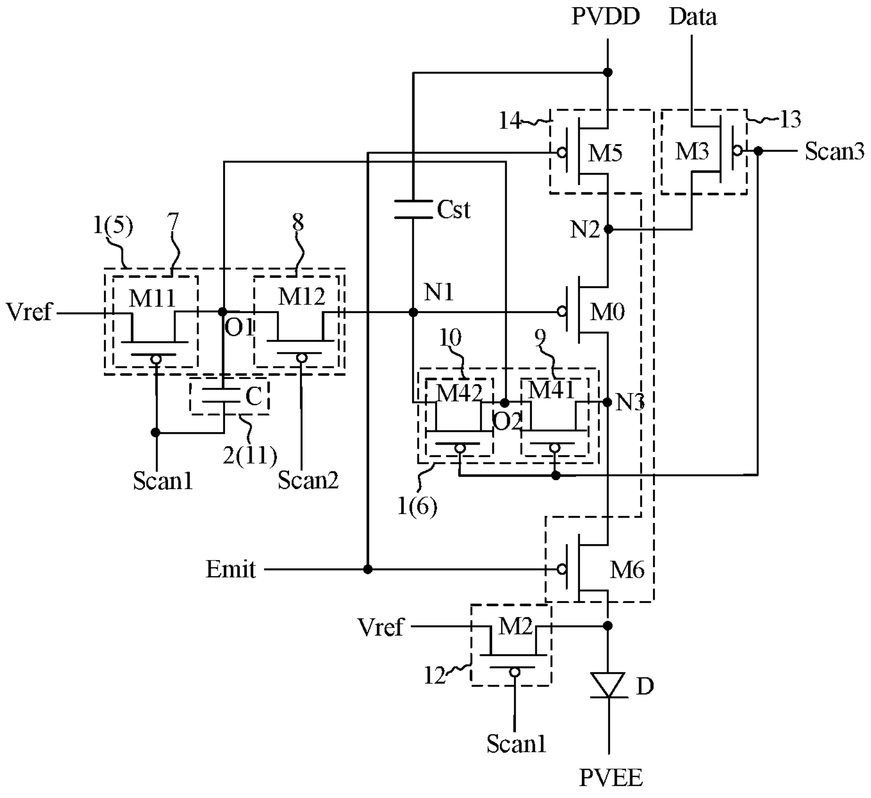
FIG. 5 is further another schematic structural diagram of a pixel circuit according to an embodiment of the present disclosure.

Moreover, FIG. 6 is a sequence diagram corresponding to FIG. 4 and FIG. 5. As shown in FIG. 6, in the first non-light-emission period T-npl1, the enable level of the first scanning signal overlaps with the enable level of the second scanning signal, and in at least a part of the second non-light-emission period T-npl2, the first scanning signal has the enable level, and the first scanning signal jumps from the enable level to the non-enable level.

With reference to the above analysis on the operation principle of the pixel circuit, the first non-light-emission period T-npl1T includes a reset period t1 and a charging period t2. Because the enable level of the first scanning signal overlaps with the enable level of the second scanning signal, in the reset period t1, the first reset unit 7 and the second reset unit 8 are turned on at the same time, and the reset voltage is written into the first node N1, to reset the gate of the driving transistor M0. In the second non-light-emission period T-npl2, when the first scanning signal is set to the enable level, the reset voltage is written into the first intermediate node O1 through the turned-on first reset unit 7. Then, the first scanning signal jumps from the enable level to the non-enable level, the voltage of the first electrode of the regulation capacitor C jumps, which causes the voltage of the second electrode of the regulation capacitor C to rise, thereby adjusting the voltage of the first intermediate node O1 and/or the second intermediate node O2 electrically connected to the second electrode to the first voltage.

By improving the arrangement manner of the scanning signal line connected to the first reset module 5, this structure can use the first scanning signal line Scan1 connected to the first reset unit 7 as a signal line for providing the first signal to the regulation capacitor C. The coordination of levels outputted by the first scanning signal line Scan1 and the second scanning signal line Scan2 at different moments not only realizes normal resetting of the first node N1 in the writing frame WF but also raises the potential of the first intermediate node O1 (or the first intermediate node O1 and the second intermediate node O2) in the holding frame HF.

Moreover, in such a configuration, before the potential of the first intermediate node O1 (or the first intermediate node O1 and the second intermediate node O2) is raised by using the jump of the first scanning signal, the first reset unit 7 first transmits the reset voltage to the first intermediate node O1 (or the first intermediate node O1 and the second intermediate node O2) in response to the enable level of the first scanning signal, to write a fixed reference potential into the first intermediate node O1 (or the first intermediate node O1 and the second intermediate node O2), and then further raises the potential based on the fixed reset voltage. Such a configuration controls the raised potential more accurately, so that the potential can be better raised to the first voltage.

Figure 7:
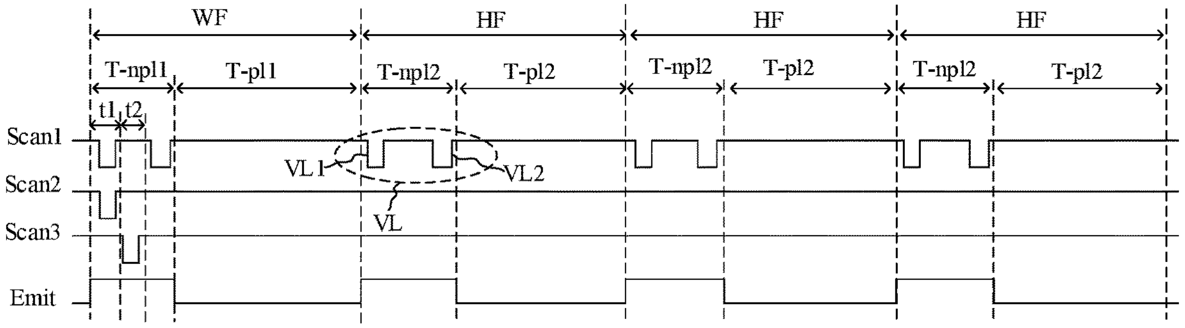
FIG. 7 is another sequence diagram corresponding to FIG. 4 and FIG. 5.

Further, referring to FIG. 6 again, the first scanning signal may have only one enable level in a single writing frame WF and a single holding frame HF. Alternatively, the first scanning signal may have a plurality of enable levels in a single writing frame WF and a single holding frame HF. For example, FIG. 7 is another sequence diagram corresponding to FIG. 4 and FIG. 5. As shown in FIG. 7, the first scanning signal includes active level sets VL outputted periodically. Each active level set VL includes a first enable level VL1 and a second enable level VL2, and in the first non-light-emission period T-npl1, the first enable level VL1 overlaps with the enable level of the second scanning signal. In such a configuration, the first scanning signal has a large number of enable levels, and can reset the first intermediate node O1 and/or the second intermediate node O2 at a higher frequency, thereby achieving a better voltage regulation effect for the intermediate node.

Further, with reference to FIG. 4, when the second electrode of the regulation capacitor C is electrically connected to the first intermediate node O1, the capacitance value C of the regulation capacitor C satisfies the following condition:

$$C\_1\times(V_{N1}-\Delta V-V_{ref})<C\times(V_{GH1}-V_{GL1})<C\_1\times(V_{N1}+\Delta V-V_{ref}) \quad (1)$$

where $V_{ref}$ is the reset voltage, $V_{GH1}$ is a voltage of a non-enable level in the first scanning signal, $V_{GL1}$ is a voltage of the enable level in the first scanning signal, and C_1 is a node capacitance of the first intermediate node O1.

In should be noted that, $C\_1=C_{\_O1}=C_{\_M11}+C_{\_m12}+C$, wherein $C_{\_M11}$ is a parasitic capacitance of the first reset unit 7, and $C_{\_M12}$ is a parasitic capacitance of the second reset unit 8. That is, C_1 is a sum of the parasitic capacitance $C_{\_M11}$ of the first reset unit 7, the parasitic capacitance $C_{\_M12}$ of the second reset unit 8, and the regulation capacitance C. In may be understood that, the first intermediate node O1 also has coupling capacitances with other lines, but such coupling capacitances are very small, which are far less than the parasitic capacitance $C_{\_M11}$ of the first reset unit 7, the parasitic capacitance $C_{\_M12}$ of the second reset unit 8, and the regulation capacitance C, and therefore can be neglected.

It is assumed that the voltage of the first electrode of the regulation capacitor C is $V_a$, and the voltage of the second electrode is $V_b$. When the first scanning signal jumps from the enable level to the non-enable level, it can be learned from the capacitance characteristics that, $\Delta V_a\times C=\Delta V_b\times C\_1$; $\Delta V_a=V_{GH1}-V_{GL1}$, while $\Delta V_{bmax}=V_{N1}+\Delta V-V_{ref}$ and $\Delta V_{bmin}=V_{N1}-\Delta V-V_{ref}$; therefore, equation (1) can be obtained based on the above.

By making the capacitance value of the regulation capacitor C satisfy the foregoing equation (1), during coupling of the voltage of the first intermediate node O1 by using the jump of the first scanning signal, the voltage of the first intermediate node O1 can be effectively coupled to the first voltage, so that the voltage of the first intermediate node O1 is closer to the voltage of the first node N1, thus reducing the voltage difference thereof.

Alternatively, referring to FIG. 5 again, when the second electrode of the regulation capacitor C is electrically connected to the first intermediate node O1 and the second intermediate node O2, the capacitance value C of the regulation capacitor C satisfies the following condition:

$$C\_2\times(V_{N1}-\Delta V-V_{ref})<C\times(V_{GH1}-V_{GL1})<C\_2\times(V_{N1}+\Delta V-V_{ref}) \quad (2)$$

where C_2 is a sum of a node capacitance of the first intermediate node O1 and a node capacitance of the second intermediate node O2.

It should be noted that, $C\_2=C_{\_O1}+C_{\_O2}$, $C_{\_O1}=C_{\_M11}+C_{\_M12}+C$, and $C_{\_O2}=C_{\_M41}+C_{\_M42}$, wherein $C_{\_M41}$ is a parasitic capacitance of the first compensation unit 9, and $C_{\_M42}$ is a parasitic capacitance of the second compensation unit 10. That is, C_2 is a sum of the parasitic capacitance $C_{\_M11}$ of the first reset unit 7, the parasitic capacitance $C_{\_M12}$ of the second reset unit 8, the regulation capacitance C, the parasitic capacitance $C_{\_M41}$ of the first compensation unit 9 and the parasitic capacitance $C_{\_M42}$ of the second compensation unit 10. In may be understood that, the first intermediate node O1 and the second intermediate node O2 also have coupling capacitances with other lines, but such coupling capacitances are very small and thus can be neglected.

It is assumed that the voltage of the first electrode of the regulation capacitor C is $V_a$, and the voltage of the second electrode is $V_b$. When the first scanning signal jumps from the enable level to the non-enable level, it can be learned from the capacitance characteristics that, $\Delta V_a\times C=\Delta V_b\times C\_2$, wherein $\Delta V_a=V_{GH1}-V_{GL1}$, $\Delta V_{bmax}=V_{N1}+\Delta V-V_{ref}$, and $\Delta V_{bmin}=V_{N1}-\Delta V-V_{ref}$. Therefore, equation (2) can be obtained based on the above.

By making the capacitance value of the regulation capacitor C satisfy the foregoing equation (2), during coupling of the voltages of the first intermediate node O1 and the second intermediate node O2 by using the jump of the first scanning signal, the voltages of the first intermediate node O1 and the second intermediate node O2 can be effectively coupled to the first voltage, thereby effective reducing the voltage differences between the first node N1 and the first intermediate node O1 as well as the second intermediate node O2.

In an implementation, referring to FIG. 4 and FIG. 5 again, the pixel circuit further includes a second reset module 12. The second reset module 12 is electrically connected to the first scanning signal line Scan1, the reset signal line Vref, and the anode of the light-emitting element D, and is configured to write the reset voltage into the anode of the light-emitting element D in response to the enable level of the first scanning signal.

With reference to the analysis in FIG. 1 and FIG. 2, in the related art, the second reset module 12 resets the anode of the light-emitting element D only in the writing frame WF; the potential of the anode of the light-emitting element D is forced down by using the reset voltage, to control the light-emitting element D to quickly switch to a complete off state. In the holding frame HF, the anode of the light-emitting element D is not reset, and the light-emitting control signal is set to a high potential to cut off a current path between the third node N3 and the light-emitting element D, so that the light-emitting element D is controlled to not emit light. However, even if the current path between the third node N3 and the light-emitting element D is cut off, an off-state leakage current of the second reset module 12 will still flow into the light-emitting element D, to cause certain residual brightness of the light-emitting element D. Therefore, in one driving cycle, the light-emitting element D emits no light only in the writing frame WF, while maintains certain brightness in the holding frame HF.

Figure 8:
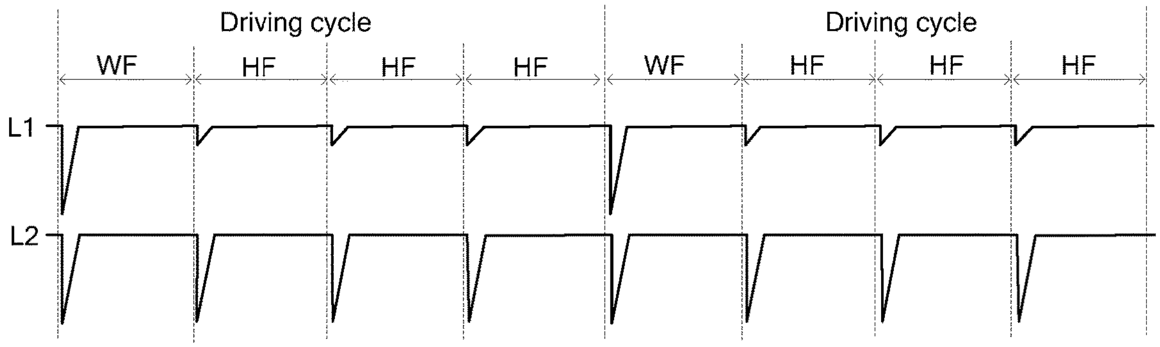
FIG. 8 is a schematic diagram of changes in brightness according to an embodiment of the present disclosure.

In this way, with reference to the schematic diagram of brightness changes shown in FIG. 8, the brightness L1 of the picture displayed by the display panel has a brightness valley only at the transition from one driving cycle to a next driving cycle. Particularly, when the display panel is driven with a low frequency, there is a relatively long time interval between two brightness valleys, and the brightness valleys are easily perceived by human eyes.

In the embodiments of the present disclosure, the second reset module 12 is electrically connected to the first scanning signal line Scan1, and the potential of the anode of the light-emitting element D is also forced down by using the first scanning signal in the holding frame HF, so that the light-emitting element D does not emit light at all. Referring to FIG. 8 again, the brightness L2 of the picture displayed by the display panel presents an obvious dark state with a relatively high frequency, and brightness valleys appear at a relatively high frequency and thus are not easily perceived by human eyes.

Figure 9:
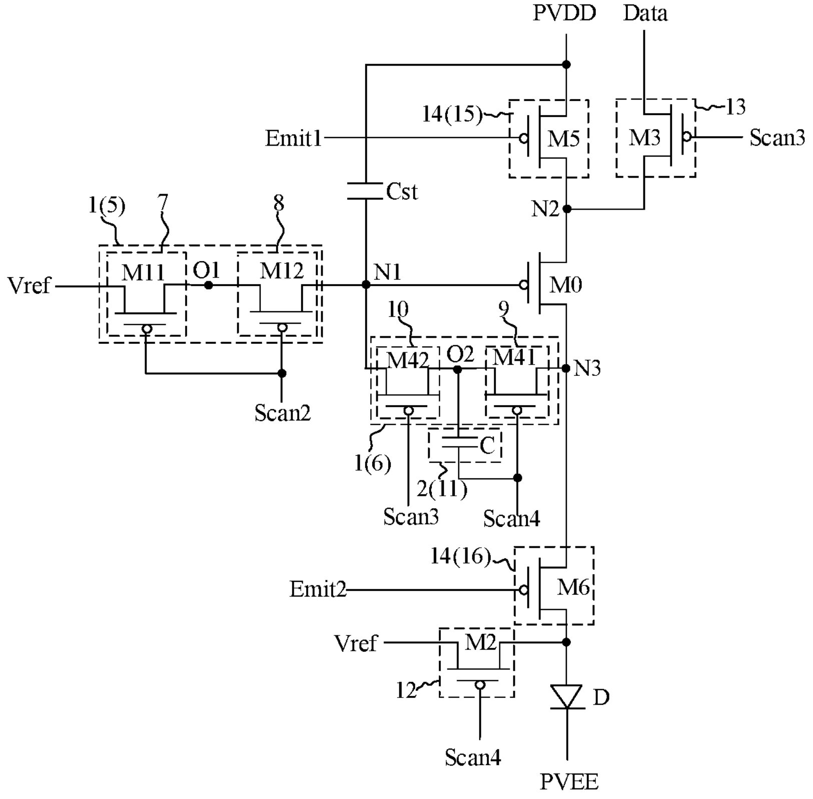
FIG. 9 is still another schematic structural diagram of a pixel circuit according to an embodiment of the present disclosure.
Figure 10:
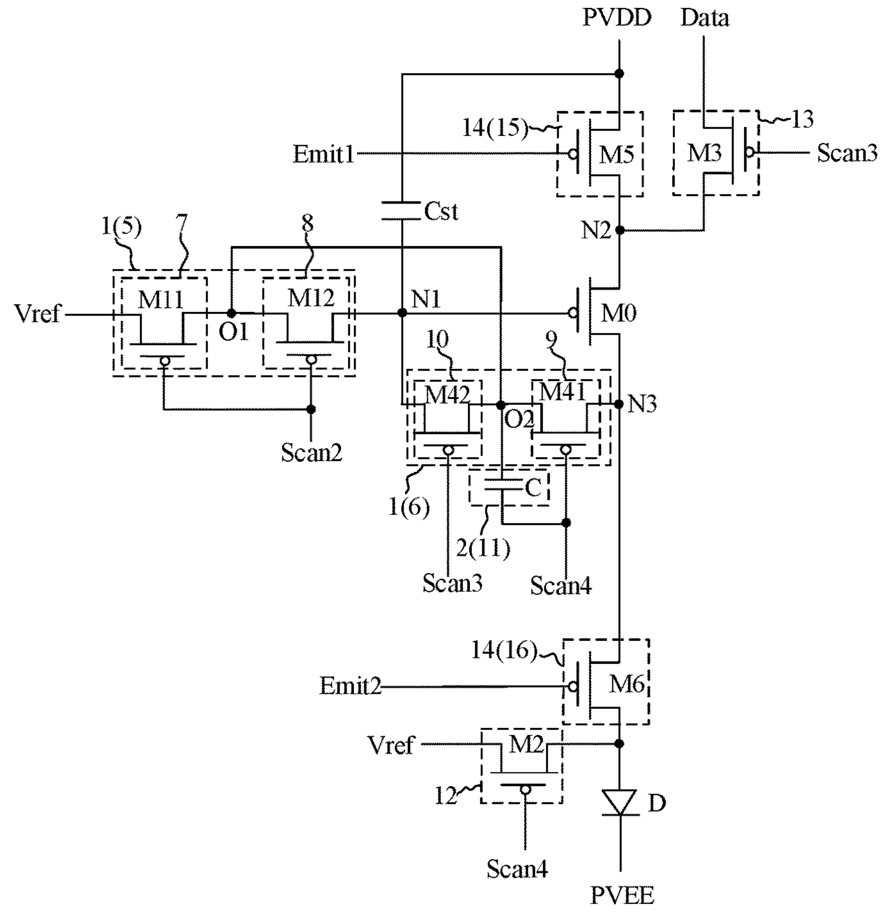
FIG. 10 is still another schematic structural diagram of a pixel circuit according to an embodiment of the present disclosure.

In an implementation, FIG. 9 is still another schematic structural diagram of a pixel circuit according to an embodiment of the present disclosure; FIG. 10 is still another schematic structural diagram of a pixel circuit according to an embodiment of the present disclosure. As shown in FIG. 9 and FIG. 10, the pixel circuit further includes a data writing module 13, a light-emitting control module 14, and a second reset module 12.

The data writing module 13 is electrically connected to a third scanning signal line Scan3, a data line Data, and the second node N2 and is configured to write a data voltage into the second node N2 in response to an enable level of a third scanning signal.

Figure 11:
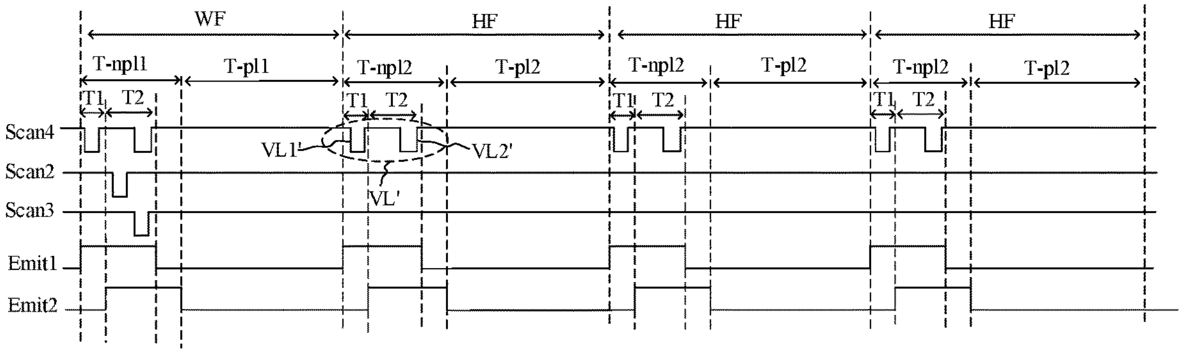
FIG. 11 is a sequence diagram corresponding to FIG. 9 and FIG. 10.

The light-emitting control module 14 includes a first light-emitting control unit 15 and a second light-emitting control unit 16. The first light-emitting control unit 15 is electrically connected to a first light-emitting control signal line Emit1, the power signal line PVDD, and the second node N2. The second light-emitting control unit 16 is electrically connected to a second light-emitting control signal line Emit2, the third node N3, and the anode of the light-emitting element D. Referring to FIG. 6 and FIG. 11, the writing frame WF further includes a first light-emission period T-lp1, and the holding frame HF further includes a second light-emission period T-lp2. The first light-emitting control unit 15 is configured to write a power voltage into the second node N2 in the first light-emission period T-lp1 and the second light-emission period T-lp2 in response to an enable level of a first light-emitting control signal. The second light-emitting control unit 16 is configured to write the voltage of the third node N3 into the anode of the light-emitting element D in the first light-emission period T-lp1 and the second light-emission period T-lp2 in response to an enable level of a second light-emitting control signal.

The second reset module 12 is electrically connected to a fourth scanning signal line Scan4, the reset signal line Vref, and the anode of the light-emitting element D. The second reset module 12 is configured to write the reset voltage into the anode of the light-emitting element D in response to an enable level of a fourth scanning signal.

The first compensation unit 9 is electrically connected to the fourth scanning signal line Scan4, and is configured to write the voltage of the second node N2 into the second intermediate node O2 in response to the enable level of the fourth scanning signal. The second compensation unit 10 is electrically connected to the third scanning signal line Scan3, and is configured to write the voltage of the second intermediate node O2 into the first node N1 in response to the enable level of the third scanning signal.

On this basis, the first electrode of the regulation capacitor C is electrically connected to the fourth scanning signal line Scan4. Referring to FIG. 9 again, the second electrode of the regulation capacitor C is electrically connected to the second intermediate node O2; or referring to FIG. 10 again, the second electrode of the regulation capacitor C is electrically connected to the first intermediate node O1 and the second intermediate node O2.

FIG. 11 is a sequence diagram corresponding to FIG. 9 and FIG. 10. As shown in FIG. 11, the first non-light-emission period T-npl1 and the second non-light-emission period T-npl2 each include a first sub-period T1 and a second sub-period T2, and the first sub-period T1 is located before the second sub-period T2. In the first sub-period T1, the first light-emitting control signal has a non-enable level, and the second light-emitting control signal has an enable level; in the second sub-period T2, the first light-emitting control signal and the second light-emitting control signal each have a non-enable level.

The fourth scanning signal includes active level sets VL' that are outputted periodically. Each active level set includes a first enable level VL1' and a second enable level VL2', the first enable level VL1' is located in the first sub-period T1, the second enable level VL2' is located in the second sub-period T2, and the second enable level VL2' overlaps with the enable level of the third scanning signal.

Specifically, in the second sub-period T2 of the writing frame WF, the second enable level VL2' overlaps with the enable level of the third scanning signal. The second enable level VL2' and the enable level of the third scanning signal control the first compensation unit 9 and the second compensation unit 10 to be turned on simultaneously, to ensure that the pixel circuit can compensate the threshold voltage of the driving transistor M0.

It may be understood that, in the writing frame WF, the second enable level VL2' is used for compensating the threshold voltage of the driving transistor M0. Therefore, in the writing frame WF, the second enable level VL2' is the level that actually words, while the first enable level VL1' does not work actually.

In the first sub-period T1 of the holding frame HF, the second light-emitting control signal has an enable level, and the reset voltage $V_{ref}$ provided by the reset signal line Vref is written into the third node N3 through the second reset module 12 and the second light-emitting control unit 16. At the same time, the fourth scanning signal has a first enable level VL1', and the reset voltage $V_{ref}$ is further written into the second intermediate node O2 through the second compensation unit 10. Then, the fourth scanning signal jumps from the enable level to the non-enable level, and the potential of the first electrode of the regulation capacitor C is pulled up, so that the potential of the second electrode of the regulation capacitor C is also pulled up, to pull up the potential of the second intermediate node O2 (or the second intermediate node O2 and the first intermediate node O1) electrically connected to the second electrode to the first voltage.

It should be noted that, in the first sub-period T1, the first light-emitting control signal has a non-enable level, and the path between the power signal line PVDD and the second node N2 is cut off. Therefore, even if the second light-emitting control unit 16 controls the path between the third node N3 and the anode of the light-emitting element D to be turned on, the light-emitting element D will not be driven to emit light.

It may be understood that, in the holding frame HF, the second enable level VL2' overlaps with the non-enable levels of the first light-emitting control signal and the second light-emitting control signal, and the second enable level VL2' is not used for pulling up the potential of the second intermediate node O2 (or the second intermediate node O2 and the first intermediate node O1). Therefore, in the holding frame HF, the first enable level VL1' is the level that actually works, while the second enable level VL2' may not work actually.

By improving the arrangement manner of the light-emitting control signal line connected to the light-emitting control module 14 and the scanning signal line connected to the threshold compensation module 6, this structure can use the fourth scanning signal line Scan4 connected to the first compensation unit 9 as a signal line for providing the first signal to the regulation capacitor C. The coordination of the levels outputted by the third scanning signal line Scan3 and the fourth scanning signal line Scan4 at different moments not only realizes threshold compensation for the driving transistor M0 in the writing frame WF, but also raises the potential of the second intermediate node O2 (or the first intermediate node O1 and the second intermediate node O2) in the holding frame HF.

Moreover, in such a configuration, before the potential of the second intermediate node O2 (or the first intermediate node O1 and the second intermediate node O2) is raised by using the jump of the fourth scanning signal, the path between the reset signal line Vref and the second intermediate node O2 (or the first intermediate node O1 and the second intermediate node O2) is first turned on by using the second reset module 12, the second light-emitting control unit 16, and the first compensation unit 9, so that the reset voltage is transmitted to the second intermediate node O2 (or the first intermediate node O1 and the second intermediate node O2), to write a fixed reference potential into the second intermediate node O2 (or the first intermediate node O1 and the second intermediate node O2), and then the potential is raised based on the fixed reset voltage. Such a configuration controls the raised potential more accurately, so that the potential can be better raised to the first voltage.

Moreover, in the foregoing structure, the second reset module 12 is electrically connected to the fourth scanning signal line Scan4, and the second reset module 12 can further reset the anode of the light-emitting element D at a high frequency under the effect of the fourth scanning signal, and the potential of the anode of the light-emitting element D is also forced down in the holding frame HF, so that the light-emitting element D does not emit light at all. With reference to the above analysis and FIG. 8, the brightness valleys of the picture displayed by the display panel can appear at a relatively high frequency, to reduce the risk of the brightness flickering being perceived by human eyes.

Further, referring to FIG. 9 again, when the second electrode of the regulation capacitor C is electrically connected to the second intermediate node O2, the capacitance value C' of the regulation capacitor C satisfies the following condition:

$$C\_3\times(V_{N1}-\Delta V-V_{ref})<C'\times(V_{GH2}-V_{GL2})<C\_3\times(V_{N1}+\Delta V-V_{ref}) \tag{3}$$

where $V_{ref}$ is the reset voltage, $V_{GH2}$ is a voltage of a non-enable level in the fourth scanning signal, $V_{GL2}$ is a voltage of the enable level in the fourth scanning signal, and C_3 is a node capacitance of the second intermediate node O2.

It should be noted that, $C\_3=C_{\_O2}'=C_{\_M41}+C_{\_M42}+C'$, wherein $C_{\_M41}$ is a parasitic capacitance of the first compensation unit 9 and $C_{\_M42}$ is a parasitic capacitance of the second compensation unit 10. That is, C_3 is a sum of the parasitic capacitance $C_{\_M41}$ of the first compensation unit 9, the parasitic capacitance $C_{\_M42}$ of the second compensation unit 10, and the capacitance C' of the regulation capacitor C. In may be understood that, the second intermediate node O2 also has coupling capacitances with other lines, but such coupling capacitances are very small and thus can be neglected.

It is assumed that the voltage of the first electrode of the regulation capacitor C is $V_c$, and the voltage of the second electrode is $V_d$. When the enable level of the fourth scanning signal jumps to the non-enable level, it can be learned from the capacitance characteristics that, $\Delta V_c\times C'=\Delta V_d\times C\_3$, wherein $\Delta V_c=V_{GH2}-V_{GL2}$, $\Delta V_{dmax}=V_{N1}+\Delta V-V_{ref}$, and $\Delta V_{dmin}=V_{N1}-\Delta V-V_{ref}$. Therefore, equation (3) can be obtained based on the above.

By making the capacitance value C' of the regulation capacitor C satisfy the foregoing equation (3), during coupling of the voltage of the first intermediate node O1 by using jump of the fourth scanning signal, the voltage of the second intermediate node O2 can be effectively coupled to the first voltage that is closer to the voltage of the first node N1, thereby effectively reducing the voltage difference between the second intermediate node O2 and the first node N1.

Alternatively, referring to FIG. 10 again, when the second electrode of the regulation capacitor C is electrically connected to the first intermediate node O1 and the second intermediate node O2, the capacitance value C' of the regulation capacitor C satisfies the following condition:

$$C\_4\times(V_{N1}-\Delta V-V_{ref})<C'\times(V_{GH2}-V_{GL2})<C\_4\times(V_{N1}+\Delta V-V_{ref}) \tag{4}$$

where C_4 is a sum of a node capacitance of the first intermediate node O1 and a node capacitance of the second intermediate node O2.

It should be noted that, $C\_4=C_{\_O1}'+C_{\_O2}'$, $C_{\_O1}'=C_{\_M11}+C_{\_M12}$, wherein $C_{\_M11}$ is a parasitic capacitance of the first reset unit 7, and $C_{\_M12}$ is a parasitic capacitance of the second reset unit 8. $C_{\_O2}'=C_{\_M41}+C_{\_M42}+C'$, wherein $C_{\_M41}$ is a parasitic capacitance of the first compensation unit 9, and $C_{\_M42}$ is a parasitic capacitance of the second compensation unit 10. That is, C_4 is a sum of the parasitic capacitance $C_{\_M11}$ of the first reset unit 7, the parasitic capacitance $C_{\_M12}$ of the second reset unit 8, the parasitic capacitance $C_{\_M11}$ of the first compensation unit 9, the parasitic capacitance $C_{\_M42}$ of the second compensation unit 10, and the capacitance value C' of the regulation capacitor C. In may be understood that, the first intermediate node O1 and the second intermediate node O2 also have coupling capacitances with other lines, but such coupling capacitances are very small and thus can be neglected.

It is assumed that the voltage of the first electrode of the regulation capacitor C is $V_c$, and the voltage of the second electrode is $V_d$. When the fourth scanning signal jumps from the enable level to the non-enable level, it can be learned from the capacitance characteristics that, $\Delta V_c\times C'=V_d\times C\_4$, wherein $\Delta V_c=V_{GH2}-V_{GL2}$, $\Delta V_{dmax}=V_{N1}+\Delta V-V_{ref}$, and $\Delta V_{dmin}=V_{N1}-\Delta V-V_{ref}$. Therefore, equation (4) can be obtained based on the above.

By making the capacitance value of the regulation capacitor C satisfy the foregoing equation (4), during coupling of the voltages of the first intermediate node O1 and the second intermediate node O2 by using the jump of the fourth scanning signal, the voltages of the first intermediate node O1 and the second intermediate node O2 can be effectively coupled to the first voltage, thereby effective reducing the voltage differences between the first node N1 and the first intermediate node O1 as well as the second intermediate node O2.

Figure 12:
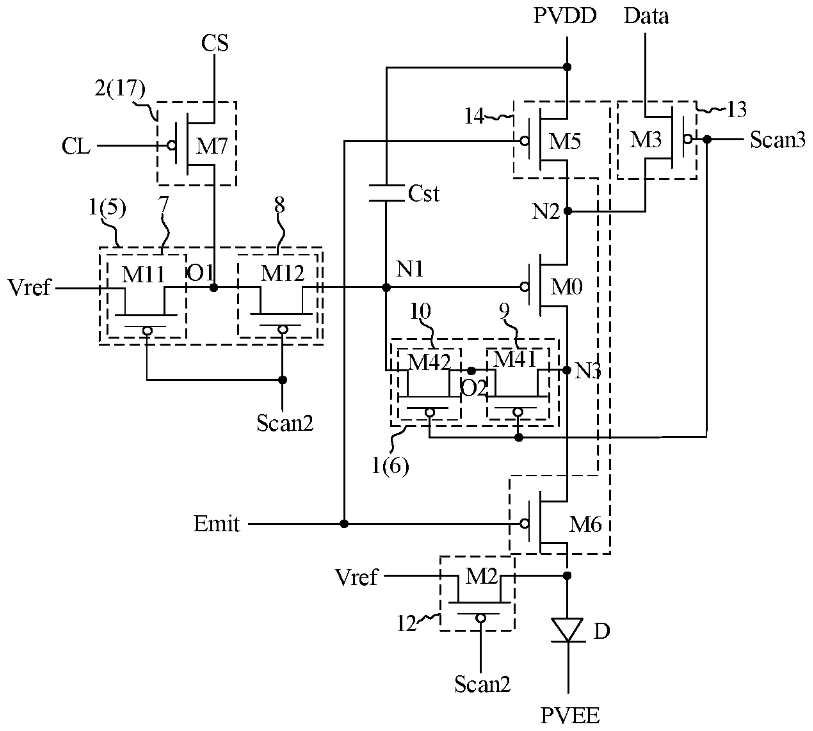
FIG. 12 is still another schematic structural diagram of a pixel circuit according to an embodiment of the present disclosure.
Figure 13:
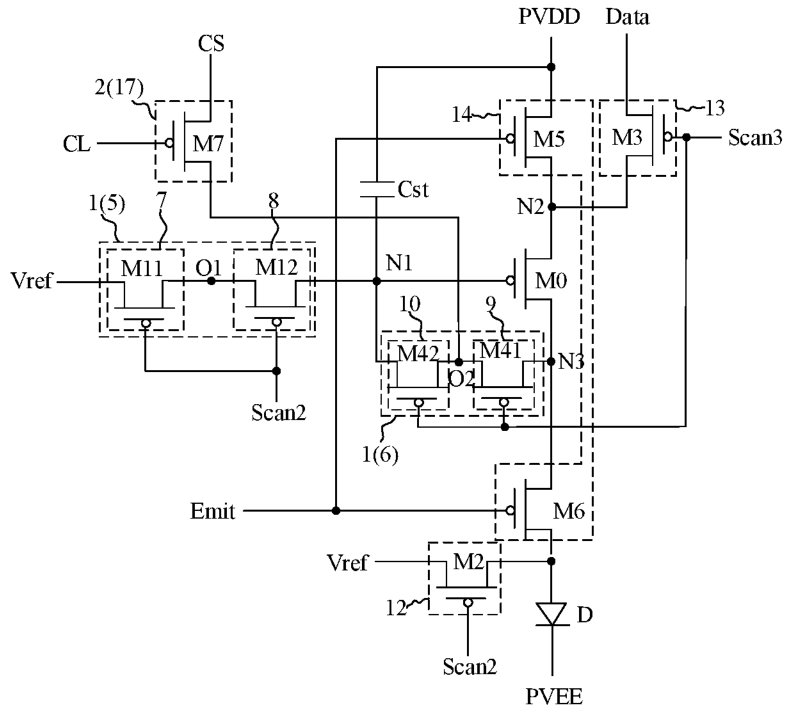
FIG. 13 is still another schematic structural diagram of a pixel circuit according to an embodiment of the present disclosure.
Figure 14:
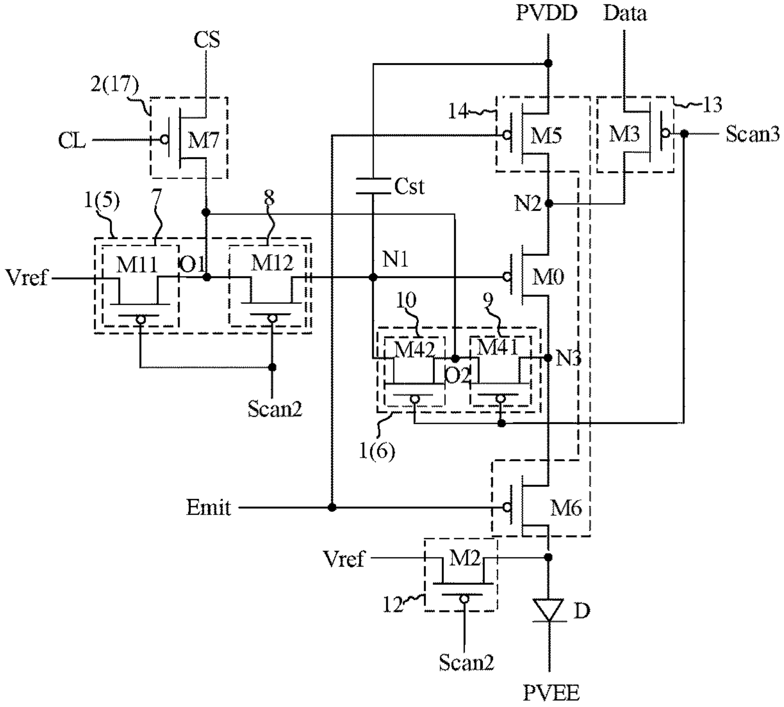
FIG. 14 is still another schematic structural diagram of a pixel circuit according to an embodiment of the present disclosure.

I an implementation, referring to FIG. 12 to FIG. 14, the voltage regulation module 2 includes a switch regulation unit 17, wherein a first terminal of the switch regulation unit 17 receives the first voltage, and a second terminal of the switch regulation unit 17 is electrically connected to the first intermediate node O1 and/or the second intermediate node O2. Specifically, FIG. 12 is still another schematic structural diagram of a pixel circuit according to an embodiment of the present disclosure; as shown in FIG. 12, the second terminal of the switch regulation unit 17 is electrically connected to the first intermediate node O1. Alternatively, FIG. 13 is still another schematic structural diagram of a pixel circuit according to an embodiment of the present disclosure; as shown in FIG. 13, the second terminal of the switch regulation unit 17 is electrically connected to the second intermediate node O2. Alternatively, FIG. 14 is still another schematic structural diagram of a pixel circuit according to an embodiment of the present disclosure; as shown in FIG. 14, the second terminal of the switch regulation unit 17 is electrically connected to the first intermediate node O1 and the second intermediate node O2.

Figure 15:
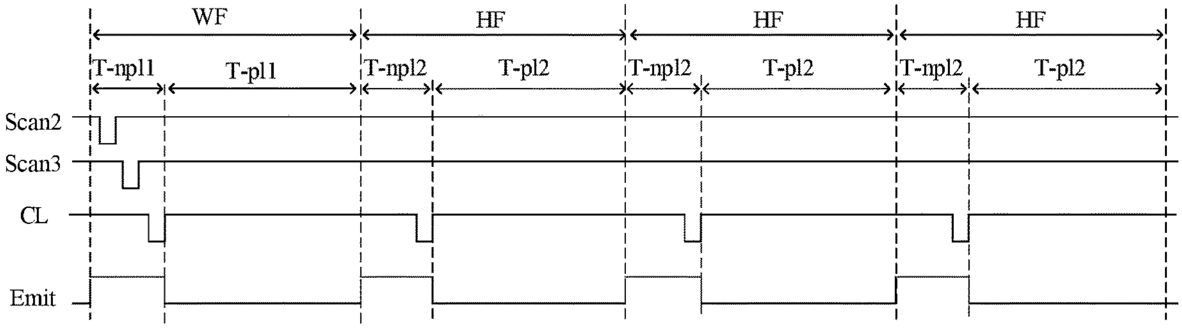
FIG. 15 is a sequence diagram corresponding to FIG. 12, FIG. 13, and FIG. 14.

FIG. 15 is a sequence diagram corresponding to FIG. 12, FIG. 13, and FIG. 14. As shown in FIG. 15, in the second non-light-emission periods T-npl2 in at least some of the holding frames HF, the switch regulation unit 17 is configured to write the first voltage into the first intermediate node O1 and/or the second intermediate node O2 electrically connected thereto, thereby directly setting the voltage of the first intermediate node O1 and/or the second intermediate node O2 to the first voltage. Such a control method better controls the adjusted voltage of the first intermediate node O1 and/or the second intermediate node O2, and the control method is simpler.

Further, referring to FIG. 12 to FIG. 14, the switch regulation unit 17 includes a regulation transistor M7, wherein a gate of the regulation transistor M7 is electrically connected to a control signal line CL, a first electrode of the regulation transistor M7 receives the first voltage, and a second electrode of the regulation transistor M7 is electrically connected to the first intermediate node O1 and/or the second intermediate node O2. In the second non-light-emission periods T-npl2 in at least some of the holding frames HF, the control signal line CL provides an enable level, and the regulation transistor M7 transmits the first voltage to the first intermediate node O1 and/or the second intermediate node O2 in response to an enable level of a control signal. In should be noted that, in the writing frame WF, the enable level of the control signal appears after the enable level of the third scanning signal.

In an implementation, referring to FIG. 12 to FIG. 14, the first electrode of the regulation transistor M7 is electrically connected to a regulation signal line CS for providing the first voltage, so as to directly transmit the first voltage provided by the regulation signal line CS to the intermediate node O electrically connected thereto when the regulation transistor M7 is turned on.

Figure 16:
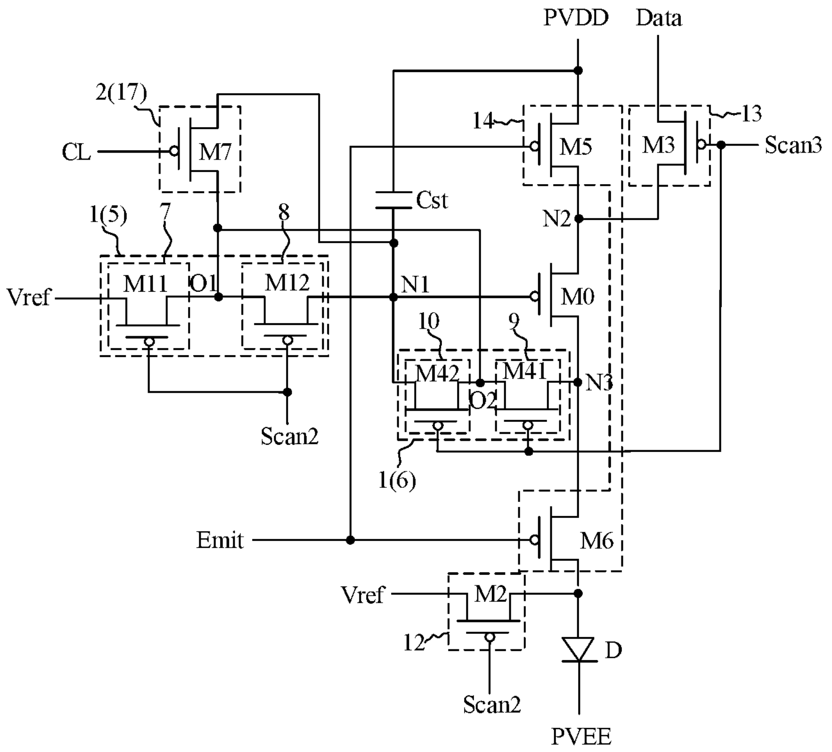
FIG. 16 is still another schematic structural diagram of a pixel circuit according to an embodiment of the present disclosure.

Alternatively, in another implementation, FIG. 16 is still another schematic structural diagram of a pixel circuit according to an embodiment of the present disclosure. As shown in FIG. 16, the first electrode of the regulation transistor M7 is electrically connected to the first node N1. In the second non-light-emission periods T-npl2 in at least some of the holding frames HF, the control signal line CL provides an enable level, and the regulation transistor M7 transmits the voltage of the first node N1 to the electrically connected intermediate node O in response to the enable level, so that the potential of the first node N1 is consistent with the potential of the first intermediate node O1 and/or the second intermediate node O2, thereby greatly reducing the voltage difference between the intermediate node O and the first node N1 and alleviating the electric leakage of the first node N1 in the second light-emission period T-lp2.

In an implementation, the first reset unit 7 includes a first reset transistor M11, wherein a first electrode of the first reset transistor M11 is electrically connected to the reset signal line Vref, and a second electrode of the first reset transistor M11 is electrically connected to the first intermediate node O1. The second reset unit 8 includes a second reset transistor M12, wherein a first electrode of the second reset transistor M12 is electrically connected to the first intermediate node O1, and a second electrode of the second reset transistor M12 is electrically connected to the first node N1.

The first compensation unit 9 includes a first compensation transistor M41, wherein a first electrode of the first compensation transistor M41 is electrically connected to the third node N3, and a second electrode of the first compensation transistor M41 is electrically connected to the second intermediate node O2. The second compensation unit 10 includes a second compensation transistor M42, wherein a first electrode of the second compensation transistor M42 is electrically connected to the second intermediate node O2, and a second electrode of the second compensation transistor M42 is electrically connected to the first node N1.

Referring to FIG. 4 again, when the gate of the first reset transistor M11 is electrically connected to the first scanning signal line Scan1, the first reset transistor M11 is configured to write the reset voltage into the first intermediate node O1 in response to the enable level of the first scanning signal; when the gate of the second reset transistor M12 is electrically connected to the second scanning signal line Scan2, the second reset transistor M12 is configured to write the voltage of the second intermediate node O2 into the first node N1 in response to the enable level of the second scanning signal.

When the gate of the first compensation transistor M41 and the gate of the second compensation transistor M42 are electrically connected to the third scanning signal line Scan3, the first compensation transistor M41 and the second compensation transistor M42 are configured to write the voltage of the third node N3 into the first node N1 in response to the enable level of the third scanning signal.

Alternatively, referring to FIG. 9 again, the gate of the first reset transistor M11 and the gate of the second reset transistor M12 are electrically connected to the second scanning signal line Scan2, the gate of the first reset transistor M11 and the second reset transistor M12 are configured to write the reset voltage into the first node N1 in response to the enable level of the second scanning signal.

When the gate of the first compensation transistor M41 is electrically connected to the fourth scanning signal line Scan4, the first compensation transistor M41 is configured to write the voltage of the third node N3 into the second intermediate node O2 in response to the enable level of the fourth scanning signal; when the gate of the second compensation transistor M42 is electrically connected to the third scanning signal line Scan3, the second compensation transistor M42 is configured to write the voltage of the second intermediate node O2 into the first node N1 in response to the enable level of the third scanning signal.

In an implementation, referring to FIG. 9 again, the pixel circuit further includes a data writing module 13, a second reset module 12, and a light-emitting control module 14.

The data writing module 13 includes a data writing transistor M3, wherein a first electrode of the data writing transistor M3 is electrically connected to the data line Data, and a second electrode of the data writing transistor M3 is electrically connected to the second node N2. The second reset module 12 includes a third reset transistor M2, wherein a first electrode of the third reset transistor M2 is electrically connected to the reset signal line Vref, and a second electrode of the third reset transistor M2 is electrically connected to the anode of the light-emitting element D. The light-emitting control module 14 includes a first light-emitting control transistor M5 and a second light-emitting control transistor M6, wherein a first electrode of the first light-emitting control transistor M5 is electrically connected to the power signal line PVDD, a second electrode of the first light-emitting control transistor M5 is electrically connected to the second node N2, a first electrode of the second light-emitting control transistor M6 is electrically connected to the third node N3, and a second electrode of the second light-emitting control transistor M6 is electrically connected to the anode of the light-emitting element D.

Referring to FIG. 4 and FIG. 9 again, when the gate of the data writing transistor M3 is electrically connected to the third scanning signal line Scan3, the data writing transistor M3 is configured to write the data voltage into the second node N2 in response to the enable level of the third scanning signal.

Referring to FIG. 4 again, when the gate of the third reset transistor M2 is electrically connected to the first scanning signal line Scant, the third reset transistor M2 is configured to write the reset voltage into the anode of the light-emitting element D in response to the enable level of the first scanning signal. Alternatively, referring to FIG. 9 again, when the gate of the third reset transistor M2 is electrically connected to the fourth scanning signal line Scan4, the third reset transistor M2 is configured to write the reset voltage into the anode of the light-emitting element D in response to the enable level of the fourth scanning signal.

Referring to FIG. 4 again, when the gate of the first light-emitting control transistor M5 and the gate of the second light-emitting control transistor M6 are electrically connected to the light-emitting control signal line Emit, the first light-emitting control transistor M5 and the second light-emitting control transistor M6 transmits the driving current to the anode of the light-emitting element D in response to the enable level of the light-emitting control signal. Alternatively, referring to FIG. 9 again, when the gate of the first light-emitting control transistor M5 is electrically connected to the first light-emitting control signal line Emit1, the first light-emitting control transistor M5 is configured to write the power voltage into the second node N2 in response to the enable level of the first light-emitting control signal. The gate of the second light-emitting control transistor M6 is electrically connected to the second light-emitting control signal line Emit2, the second light-emitting control transistor M6 is configured to transmit the driving current obtained through conversion by the driving transistor M0 to the anode of the light-emitting element D in response to the enable level of the second light-emitting control signal.

Based on the same inventive concept, the embodiments of the present disclosure further provide a driving method for a pixel circuit. With reference to FIG. 3, FIG. 4, FIG. 5, FIG. 9 and FIG. 10, the pixel circuit includes a driving transistor M0, at least one control module 1, and a voltage regulation module 2.

A gate of the driving transistor M0 is electrically connected to a first node N1, a first electrode of the driving transistor M0 is electrically connected to a second node N2, and a second electrode of the driving transistor M0 is electrically connected to a third node N3. The at least one control module 1 is each electrically connected to the first node N1 and configured to write a voltage into the first node N1. Each control module 1 includes a first unit 3 and a second unit 4 that are connected in series, and an intermediate node O is arranged between the first unit 3 and the second unit 4. The voltage regulation module 2 includes a capacitance regulation unit 11, wherein a first terminal of the capacitance regulation unit 11 receives a first signal, and a second terminal of the capacitance regulation unit 11 is electrically connected to at least one intermediate node O.

Figure 17:
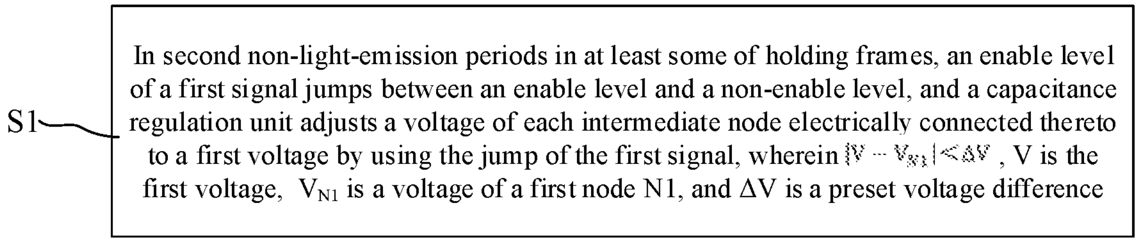
FIG. 17 is a flowchart of a driving method according to an embodiment of the present disclosure.

With reference to FIG. 6, FIG. 7, and FIG. 11, a driving cycle of the pixel circuit includes a writing frame WF and at least one holding frame HF. The writing frame WF includes a first non-light-emission period T-npl1, and each holding frame HF includes a second non-light-emission period T-npl2. FIG. 17 is a flowchart of a driving method according to an embodiment of the present disclosure. As shown in FIG. 17, the driving method includes the following steps:

Step S1: In the second non-light-emission periods T-npl2 in at least some of the holding frames HF, the enable level of the first signal jumps between the enable level and the non-enable level, and the capacitance regulation unit 11 adjusts the voltage of each intermediate node O electrically connected thereto to the first voltage by using the jump of the first signal, wherein $|V-V_{N1}|<\Delta V$, V is the first voltage, $V_{N1}$ is a voltage of the first node N1, and $\Delta V$ is a preset voltage difference.

In the embodiments of the present disclosure, by setting the voltage regulation module 2, the voltage of each intermediate node O electrically connected thereto can be adjusted to the first voltage by the capacitance regulation unit 11 in at least some of the holding frames HF, so that such intermediate nodes O are reset at a high frequency, and the potential of such intermediate nodes O is pulled up, thereby maintaining the voltage difference between the intermediate node O and the first node N1 within the range of the preset voltage difference $\Delta V$. In this way, the voltage difference between the intermediate node O and the first node N1 is reduced, thereby reducing the electric leakage from the first node N1 to the intermediate node O, so that the potential of the gate of the driving transistor M0 is maintained at $V_{Data}-V_{th}$, and thus the driving current obtained through conversion by the driving transistor M0 is closer to a standard current. That is, even in the case of low-frequency driving, the present disclosure can effectively solve the problem of screen flickering due to an increase in the driving current and optimize the display effect.

In an implementation, to make the voltage of the intermediate node O after the regulation closer to the voltage of the first node N1, $\Delta V$ may satisfy the following condition: $\Delta V \leq 0.5V$.

In an implementation, to reset the intermediate node O at a higher frequency, the capacitance regulation unit 11 adjusts the voltage of the intermediate node O electrically connected thereto to the first voltage in the second non-light-emission period T-npl2 in each holding frame HF.

In an implementation, with reference shown in FIG. 4, FIG. 5, FIG. 9 and FIG. 10, the at least one control module 1 includes a first reset module 5 and a threshold compensation module 6. The first reset module 5 is electrically connected between a reset signal line Vref and the first node N1 and includes a first reset unit 7 and a second reset unit 8 that are connected in series, and a first intermediate node O1 is arranged between the first reset unit 7 and the second reset unit 8. The threshold compensation module 6 is electrically connected between the third node N3 and the first node N1 and includes a first compensation unit 9 and a second compensation unit 10 that are connected in series, and a second intermediate node O2 is arranged between the first compensation unit 9 and the second compensation unit 10.

The capacitance regulation unit 11 includes a regulation capacitor C, wherein a first electrode of the regulation capacitor C receives a first signal, and a second electrode of the regulation capacitor C is electrically connected to the first intermediate node O1 and/or the second intermediate node O2.

On this basis, the process of adjusting, by the capacitance regulation unit 11, the voltage of each intermediate node O electrically connected thereto to the first voltage includes: when the first signal jumps from the enable level to the non-enable level, adjusting, by the regulation capacitor C, a voltage of the second electrode to the first voltage by using a voltage jump of the first electrode of the regulation capacitor C.

Specifically, in the second non-light-emission period T-npl2, the first signal jumps from a low level to a high level, to pull up the voltage of the first terminal of the capacitance regulation unit 11, and the voltage jump of the first terminal further causes a voltage jump of the second terminal, so that the voltage of the second terminal is also pulled up, thereby adjusting the voltage of the first intermediate node O1 and/or the second intermediate node O2 connected to the second terminal to the first voltage. Based on the foregoing driving method, the voltage regulation module 2 resets the first intermediate node O1 and/or the second intermediate node O2 at a high frequency, so that the voltage thereof is adjusted to the first voltage in the second non-light-emission period T-npl2, to reduce the voltage difference between the first intermediate node O1 and/or the second intermediate node O2 and the first node N1 and reduce the electric leakage of the first node N1, thereby avoiding the problem of an increase in the light-emitting brightness of the light-emitting element D caused by the reduced potential of the first node N1.

In an implementation, with reference to FIG. 4 and FIG. 5, the first reset unit 7 is electrically connected between the reset signal line Vref and the first intermediate node O1; the first reset unit 7 is further electrically connected to a first scanning signal line Scant. The second reset unit 8 is electrically connected between the first intermediate node O1 and the first node N1; the second reset unit 8 is further electrically connected to a second scanning signal line Scan2.

The first electrode of the regulation capacitor C is electrically connected to the first scanning signal line Scant, and the second electrode of the regulation capacitor C is electrically connected to the first intermediate node O1; alternatively, the second electrode of the regulation capacitor C is electrically connected to the first intermediate node O1 and the second intermediate node O2.

On this basis, with reference to FIG. 6 and FIG. 7, the process of adjusting, by the regulation capacitor C, the voltage of the first intermediate node O1 and/or the second intermediate node O2 electrically connected thereto to the first voltage includes:

Step K1: The first reset unit 7 writes the reset voltage into second electrode in response the enable level of the first scanning signal.

Step K2: When the first scanning signal jumps from the enable level to the non-enable level, the voltage of the first electrode jumps, to adjust the voltage of the second electrode to the first voltage.

Based on the characteristic of maintaining a constant voltage difference between both ends of the capacitor, when the first scanning signal received by the first electrode of the regulation capacitor C jumps, the jump causes the voltage of the second electrode of the regulation capacitor C to change, thereby pulling up the potential of the first intermediate node O1 (or the first intermediate node O1 and the second intermediate node O2) electrically connected to the second electrode.

Moreover, in such a driving method, before the potential of the first intermediate node O1 (or the first intermediate node O1 and the second intermediate node O2) is raised by using the jump of the first scanning signal, the first reset unit 7 first transmits the reset voltage to the first intermediate node O1 (or the first intermediate node O1 and the second intermediate node O2) in response to the enable level of the first scanning signal, to write a fixed reference potential into the first intermediate node O1 (or the first intermediate node O1 and the second intermediate node O2), and then the potential is raised based on the fixed reset voltage. Such a configuration controls the raised potential more accurately, so that the potential can be better raised to the first voltage.

Alternatively, in another implementation, with reference to FIG. 9 and FIG. 10, the pixel circuit further includes a data writing module 13, a light-emitting control module 14, and a second reset module 12. The data writing module 13 is electrically connected to a third scanning signal line Scan3, a data line Data, and the second node N2. The light-emitting control module 14 includes a first light-emitting control unit 15 and a second light-emitting control unit 16. The first light-emitting control unit 15 is electrically connected to a first light-emitting control signal line Emit1, the power signal line PVDD, and the second node N2. The second light-emitting control unit 16 is electrically connected to a second light-emitting control signal line Emit2, the third node N3, and the anode of the light-emitting element D. The second reset module 12 is electrically connected to a fourth scanning signal line Scan4, the reset signal line Vref, and the anode of the light-emitting element D. The first compensation unit 9 is electrically connected to the fourth scanning signal line Scan4, and the second compensation unit 10 is electrically connected to the third scanning signal line Scan3.

The first electrode of the regulation capacitor C is electrically connected to the fourth scanning signal line Scan4, and the second electrode of the regulation capacitor C is electrically connected to the second intermediate node O2; alternatively, the second electrode of the regulation capacitor C is electrically connected to the first intermediate node O1 and the second intermediate node O2.

With reference to FIG. 11, the first non-light-emission period T-npl1 and the second non-light-emission period T-npl2 each include a first sub-period T1 and a second sub-period T2, and the first sub-period T1 is located before the second sub-period T2. In the first sub-period T1, the first light-emitting control signal has a non-enable level, and the second light-emitting control signal has an enable level; in the second sub-period T2, the first light-emitting control signal and the second light-emitting control signal each have a non-enable level.

The fourth scanning signal includes active level sets VL' that are outputted periodically. Each active level set VL' includes a first enable level VL1' and a second enable level VL2', the first enable level VL1' is located in the first sub-period T1, the second enable level VL2' is located in the second sub-period T2, and the second enable level VL2' overlaps with the enable level of the third scanning signal.

The process of adjusting, by the regulation capacitor C, the voltage of the first intermediate node O1 and/or the second intermediate node O2 electrically connected thereto to the first voltage includes:

Step K1': In the first sub-period T1, the second reset module 12 writes the reset voltage into the anode of the light-emitting element in response to the first enable level; the second light-emitting control module 14 writes the reset voltage into the third node N3 in response to the enable level of the second light-emitting control signal; and the first compensation unit 9 writes the reset voltage into the second electrode in response to the first enable level.

Step K2': When the fourth scanning signal jumps from the first enable level to the non-enable level, the voltage of the first electrode jumps, to adjust the voltage of the second electrode to the first voltage.

Based on the characteristic of maintaining a constant voltage difference between both ends of the capacitor, when the fourth scanning signal received by the first electrode of the regulation capacitor C jumps, the jump causes the voltage of the second electrode of the regulation capacitor C to change, thereby pulling up the potential of the second intermediate node O2 (or the first intermediate node O1 and the second intermediate node O2) electrically connected to the second electrode.

Moreover, in such a driving method, before the potential of the second intermediate node O2 (or the first intermediate node O1 and the second intermediate node O2) is raised by using the jump of the fourth scanning signal, the path between the reset signal line Vref and the second intermediate node O2 (or the first intermediate node O1 and the second intermediate node O2) is first turned on by using the second reset module 12, the second light-emitting control unit 16, and the first compensation unit 9, so that the reset voltage is transmitted to the second intermediate node O2 (or the first intermediate node O1 and the second intermediate node O2), to write a fixed reference potential into the second intermediate node O2 (or the first intermediate node O1 and the second intermediate node O2), and then the potential is raised based on the fixed reset voltage. Such a configuration controls the raised potential more accurately, so that the potential can be better raised to the first voltage.

Moreover, in this driving method, the second reset module 12 is electrically connected to the fourth scanning signal line Scan4. Therefore, the second reset module 12 can also force the potential of the anode of the light-emitting element D down in the holding frame HF under the effect of the fourth scanning signal, so that the brightness valleys of the picture displayed by the display panel can appear at a relatively high frequency, to reduce the risk of the brightness flickering being perceived by human eyes.

Based on the same inventive concept, the embodiments of the present disclosure further provide a driving method for a pixel circuit. With reference to FIG. 3, FIG. 12, FIG. 13, FIG. 14 and FIG. 16, the pixel circuit includes a driving transistor M0, at least one control module 1, and a voltage regulation module 2.

A gate of the driving transistor M0 is electrically connected to a first node N1, a first electrode of the driving transistor M0 is electrically connected to a second node N2, and a second electrode of the driving transistor M0 is electrically connected to a third node N3. The at least one control module 1 is each electrically connected to the first node N1 and configured to write a voltage into the first node N1. Each control module 1 includes a first unit 3 and a second unit 4 that are connected in series, and an intermediate node O is arranged between the first unit 3 and the second unit 4. The voltage regulation module 2 includes a switch regulation unit 17, wherein a first terminal of the switch regulation unit 17 receives the first voltage, and a second terminal of the switch regulation unit 17 is electrically connected to at least one intermediate node O.

Figure 18:
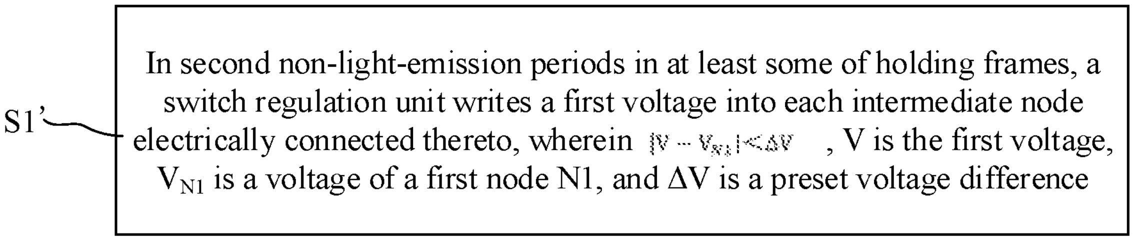
FIG. 18 is another flowchart of a driving method according to an embodiment of the present disclosure.

With reference to FIG. 15, a driving cycle of the pixel circuit includes a writing frame WF and at least one holding frame HF. The writing frame WF includes a first non-light-emission period T-npl1, and each holding frame HF includes a second non-light-emission period T-npl2. FIG. 18 is a flowchart of a driving method according to an embodiment of the present disclosure. As shown in FIG. 18, the driving method includes:

Step S1': In the second non-light-emission periods T-npl2 in at least some of the holding frames HF, the switch regulation unit 17 writes a first voltage into each intermediate node O electrically connected thereto, wherein $|V-V_{N1}<\Delta V$, V is the first voltage, $V_{N1}$ is a voltage of the first node N1, and ΔV is a preset voltage difference.

In the embodiments of the present disclosure, by setting the voltage regulation module 2, the first voltage can be directly written into the electrically connected intermediate nodes O by using the switch regulation unit 17 in at least some of the holding frames HF, so that such intermediate nodes O are reset at a high frequency, and the potential of such intermediate nodes O is pulled up, thereby maintaining the voltage difference between the intermediate node O and the first node N1 within the range of the preset voltage difference ΔV. In this way, the voltage difference between the intermediate node O and the first node N1 is reduced, thereby reducing the electric leakage from the first node N1 to the intermediate node O, so that the potential of the gate of the driving transistor M0 is maintained at $V_{Data}-V_{th}$, and thus the driving current obtained through conversion by the driving transistor M0 is closer to a standard current. That is, even in the case of low-frequency driving, the present disclosure can effectively solve the problem of screen flickering due to an increase in the driving current and optimize the display effect.

In an implementation, to make the voltage of the intermediate node O after the regulation closer to the voltage of the first node N1, ΔV may satisfy the following condition: ΔV≤0.5V.

In an implementation, to reset the intermediate node O at a higher frequency, the switch regulation unit 17 writes the first voltage to the intermediate node O electrically connected thereto in the second non-light-emission period T-npl2 in each holding frame HF.

In an implementation, the at least one control module 1 includes a first reset module 5 and a threshold compensation module 6. The first reset module 5 is electrically connected between a reset signal line Vref and the first node N1 and includes a first reset unit 7 and a second reset unit 8 that are connected in series, and a first intermediate node O1 is arranged between the first reset unit 7 and the second reset unit 8. The threshold compensation module 6 is electrically connected between the third node N3 and the first node N1 and includes a first compensation unit 9 and a second compensation unit 10 that are connected in series, and a second intermediate node O2 is arranged between the first compensation unit 9 and the second compensation unit 10.

The voltage regulation module 2 includes a regulation transistor M7, wherein a gate of the regulation transistor M7 is electrically connected to a control signal line CL, a first electrode of the regulation transistor M7 receives the first voltage, and a second electrode of the regulation transistor M7 is electrically connected to the first intermediate node O1 and/or the second intermediate node O2.

On this basis, the process of writing, by the voltage regulation module 2, the first voltage into the intermediate node O electrically connected thereto processes: the first regulation transistor M7 turns on under the effect of the enable level of the control signal, and writes the first voltage into the first intermediate node O1 and/or the second intermediate node O2 electrically connected thereto, thereby directly setting the voltage of the first intermediate node O1 and/or the second intermediate node O2 to the first voltage. Such a driving method better controls the adjusted voltage of the first intermediate node O1 and/or the second intermediate node O2, and the control method is simpler.

Further, referring to FIG. 12 to FIG. 14, the first electrode of the regulation transistor M7 is electrically connected to a regulation signal line CS for providing the first voltage. The process of writing, by the first regulation transistor M7, the first voltage into the first intermediate node O1 and/or the second intermediate node O2 electrically connected thereto includes: writing, by the first regulation transistor M7, the first voltage provided by the regulation signal line CS into the first intermediate node O1 and/or the second intermediate node O2 electrically connected thereto, to reduce the voltage difference between the intermediate node and the first node N1, thereby alleviating the electric leakage of the first node N1 in the second light-emission period T-lp2.

Alternatively, referring to FIG. 16 again, the first electrode of the regulation transistor M7 is electrically connected to the first node N1. The process of writing, by the first regulation transistor M7, the first voltage into the first intermediate node O1 and/or the second intermediate node O2 electrically connected thereto includes: writing, by the first regulation transistor M7, the voltage of the first node N1 into the first intermediate node O1 and/or the second intermediate node O2 electrically connected thereto, so that the potential of the first node N1 is consistent with the potential of the first intermediate node O1 and/or the second intermediate node O2, to greatly reduce the voltage difference between the intermediate node and the first node N1, thereby alleviating the electric leakage of the first node N1 in the second light-emission period T-lp2.

Figure 19:
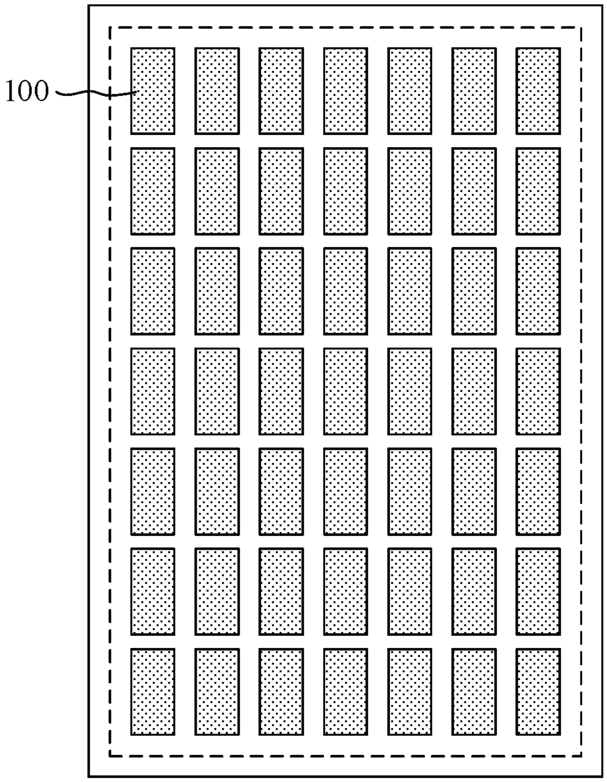
FIG. 19 is a schematic structural diagram of a display panel according to an embodiment of the present disclosure.

Based on the same inventive concept, the embodiments of the present disclosure further provide a display panel. FIG. 19 is a schematic structural diagram of a display panel according to an embodiment of the present disclosure. As shown in FIG. 19, the display panel includes the pixel circuit 100 described above. The specific structure of the pixel circuit 100 has been described in detail in the foregoing embodiments. Details are not described herein again.

Figure 20:
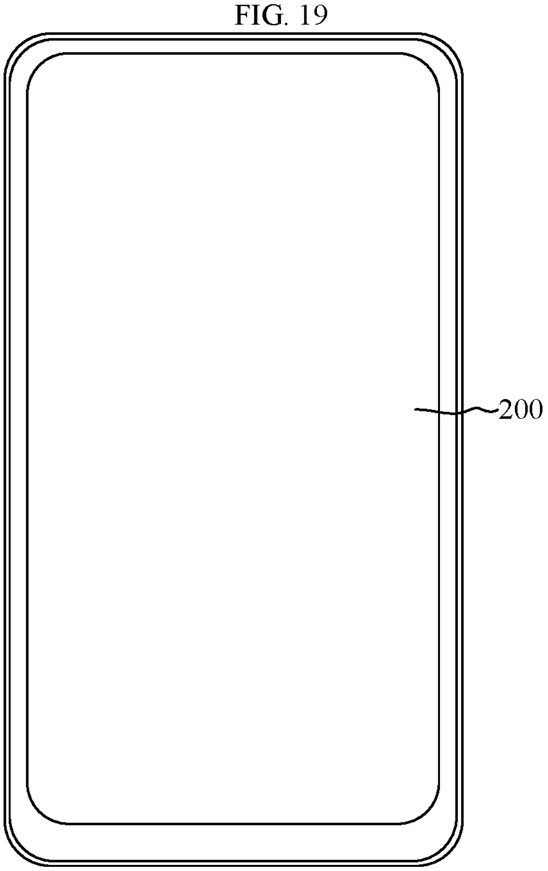
FIG. 20 is a schematic structural diagram of a display apparatus according to an embodiment of the present disclosure.

Based on the same inventive concept, the embodiments of the present disclosure further provide a display apparatus. FIG. 20 is a schematic structural diagram of a display apparatus according to an embodiment of the present disclosure. As shown in FIG. 20, the display apparatus includes the foregoing display panel 200. Certainly, the display apparatus shown in FIG. 20 is for schematic description only. The display apparatus may be any electronic device with a display function, such as a mobile phone, a tablet computer, a notebook computer, an ebook, or a television.

The above descriptions are merely preferred embodiments of the present disclosure, and are not intended to limit the present disclosure. Any modifications, equivalent replacements, improvements, and the like made within the spirit and principle of the present disclosure shall fall within the protection scope of the present disclosure.

Finally, it should be noted that the above embodiments are merely intended to describe the technical solutions of the present disclosure, rather than to limit the present disclosure. Although the present disclosure is described in detail with reference to the above examples, persons of ordinary skill in the art should understand that they may still make modifications to the technical solutions described in the above examples or make equivalent replacements to some or all technical features thereof, without departing from the essence of the technical solutions in the embodiments of the present disclosure.

What is claimed is:

1. A pixel circuit, comprising:

a driving transistor, a gate of the driving transistor being electrically connected to a first node, a first electrode of the driving transistor being electrically connected to a second node, and a second electrode of the driving transistor being electrically connected to a third node;

at least one control circuit that is electrically connected to the first node and configured to write a voltage into the first node, each of the at least one control circuit comprising a first sub-circuit and a second sub-circuit connected in series, and an intermediate node being disposed between the first sub-circuit and the second sub-circuit; and a voltage regulation circuit that is electrically connected to the intermediate node of the at least one control circuit;

wherein a driving cycle of the pixel circuit comprises a writing frame and at least one holding frame, the writing frame comprises a first non-light-emission period, the at least one holding frame comprises a second non-light-emission period, and the voltage regulation circuit is configured to adjust, in the second non-light-emission period of at least one of the at least one holding frames, a voltage of the intermediate node electrically connected to the voltage regulation circuit to a first voltage, wherein $|V-V_{N1}|<\Delta V$, V represents the first voltage, $V_{N1}$ represents the voltage of the first node, and $\Delta V$ represents a voltage difference;

the at least one control circuit comprises:

a first reset circuit, electrically connected between a reset signal line and the first node, the first reset circuit comprising a first reset sub-circuit and a second reset sub-circuit connected in series, wherein a first intermediate node is disposed between the first reset sub-circuit and the second reset sub-circuit; and a threshold compensation circuit, electrically connected between the third node and the first node, the threshold compensation circuit comprising a first compensation sub-circuit and a second compensation sub-circuit connected in series, wherein a second intermediate node is disposed between the first compensation sub-circuit and the second compensation sub-circuit;

wherein the voltage regulation circuit is electrically connected to at least one of the first intermediate node or the second intermediate node; and the voltage regulation circuit comprises a capacitance regulation sub-circuit, a first terminal of the capacitance regulation sub-circuit receives a first signal, and a second terminal of the capacitance regulation sub-circuit is electrically connected to the at least one of the first intermediate node or the second intermediate node; and in the second non-light-emission period of at least one of the at least one holding frame, the first signal jumps between an enable level and a non-enable level, and the capacitance regulation sub-circuit is configured to adjust, by using a jump of the first signal, a voltage of the at least one of the first intermediate node or the second intermediate node electrically connected to the capacitance regulation sub-circuit to the first voltage;

the capacitance regulation sub-circuit comprises a regulation capacitor, a first electrode of the regulation capacitor receives the first signal, and a second electrode of the regulation capacitor is electrically connected to the at least one of the first intermediate node or the second intermediate node;

the pixel circuit further comprises:

a light-emitting control circuit, comprising a first light-emitting control sub-circuit and a second light-emitting control sub-circuit, wherein the first light-emitting control sub-circuit is electrically connected to a first light-emitting control signal line, a power signal line, and the second node respectively, and the first light-emitting control sub-circuit is configured to write a power voltage into the second node in response to an enable level of a first light-emitting control signal; and wherein the second light-emitting control sub-circuit is electrically connected to a second light-emitting control signal line, the third node, and an anode of a light-emitting diode respectively, and the second light-emitting control sub-circuit is configured to write a voltage of the third node into the anode of the light-emitting diode in response to an enable level of a second light-emitting control signal; and a second reset circuit, electrically connected to a fourth scanning signal line, the reset signal line, and the anode of the light-emitting diode respectively, wherein the second reset circuit is configured to write a reset voltage into the anode of the light-emitting diode in response to an enable level of a fourth scanning signal;

wherein the first compensation sub-circuit is electrically connected to the fourth scanning signal line and configured to write a voltage of the second node into the second intermediate node in response to the enable level of the fourth scanning signal;

wherein the second compensation sub-circuit is electrically connected to a third scanning signal line and configured to write a voltage of the second intermediate node into the first node in response to the enable level of a third scanning signal;

wherein the first electrode of the regulation capacitor is electrically connected to the fourth scanning signal line, and the second electrode of the regulation capacitor is electrically connected to the second intermediate node, or the second electrode of the regulation capacitor is electrically connected to both the first intermediate node and the second intermediate node;

wherein the first non-light-emission period and the second non-light-emission period each comprise a first sub-period and a second sub-period, and the first sub-period is prior to the second sub-period; in the first sub-period, the first light-emitting control signal has a non-enable level, the second light-emitting control signal has an enable level; and in the second sub-period, the first light-emitting control signal and the second light-emitting control signal each have a non-enable level; and wherein the fourth scanning signal comprises an active level set that is outputted periodically, the active level set comprises a first enable level and a second enable level, the first enable level is in the first sub-period, and the second enable level is in the second sub-period and overlaps with an enable level of the third scanning signal;

in the first sub-period of the second non-light emission period of the holding frame, the second reset circuit and the first compensation sub-circuit are turned on by the fourth scanning signal line, and the second light-emitting control sub-circuit is turned on through the second light-emitting control signal line, thereby causing a path between the reset signal line and the second intermediate node and the first intermediate node to be conductive, and the second compensation sub-circuit connected to the third scanning signal line to be non-conductive, thereby writing a reset signal to at least one of the first intermediate node and the second intermediate node;

in such a configuration, the reset voltage is written into the at least one of the first intermediate node and the second intermediate node, and then a potential of at least one of the first intermediate node and the second intermediate node is raised to a first voltage based on the reset voltage;

during the first sub-period of the second non-light-emission period of the holding frame, the fourth scanning signal has the first enable level, the second light-emitting control signal has an enable level, at which time the reset voltage is further written into the second intermediate node via the second compensation sub-circuit, and at which time the first light-emitting control signal has a non-enable level such that a pathway between the power signal line and the second node is disconnected;

during the second sub-period of the second non-light-emission period of the holding frame, the fourth scanning signal has the second enable level, and the second enable level overlaps with a non-enable level of the first light-emitting control signal emit and a non-enable level of the first light-emitting control signal emit.

2. The pixel circuit according to claim 1, wherein $$\Delta V \leq 0.5V.$$

3. The pixel circuit according to claim 1, wherein:

the pixel circuit further comprises:

a data writing transistor, electrically connected to a third scanning signal line, a data line, and the second node respectively, wherein the data writing transistor is configured to write a data voltage into the second node in response to an enable level of a third scanning signal.

4. The pixel circuit according to claim 3, wherein the second electrode of the regulation capacitor is electrically connected to the second intermediate node, and a capacitance value C' of the regulation capacitor meets the following condition:

$$C\_3\times(V_{N1}-\Delta V-V_{ref})<C'\times(V_{GH2}-V_{GL2})<C\_3\times(V_{N1}+\Delta V-V_{ref}),$$

$V_{ref}$ represents the reset voltage, $V_{GH2}$ represents a voltage of a non-enable level of the fourth scanning signal, $V_{GL2}$ represents a voltage of the enable level of the fourth scanning signal, and C_3 represents a node capacitance of the second intermediate node; or the second electrode of the regulation capacitor is electrically connected to both the first intermediate node and the second intermediate node, and the capacitance value C' of the regulation capacitor meets the following condition:

$$C\_4\times(V_{N1}-\Delta V-V_{ref})<C'\times(V_{GH2}-V_{GL2})<C\_4\times(V_{N1}+\Delta V-V_{ref}),$$

where

C_4 represents a sum of a node capacitance of the first intermediate node and a node capacitance of the second intermediate node.

5. The pixel circuit according to claim 1, wherein the first reset sub-circuit comprises a first reset transistor, wherein a first electrode of the first reset transistor is electrically connected to the reset signal line, and a second electrode of the first reset transistor is electrically connected to the first intermediate node;

the second reset sub-circuit comprises a second reset transistor, wherein a first electrode of the second reset transistor is electrically connected to the first intermediate node, and a second electrode of the second reset transistor is electrically connected to the first node;

the first compensation sub-circuit comprises a first compensation transistor, wherein a first electrode of the first compensation transistor is electrically connected to the third node, and a second electrode of the first compensation transistor is electrically connected to the second intermediate node; and the second compensation sub-circuit comprises a second compensation transistor, wherein a first electrode of the second compensation transistor is electrically connected to the second intermediate node, and a second electrode of the second compensation transistor is electrically connected to the first node.

6. The pixel circuit according to claim 1, wherein the pixel circuit further comprises:

a data writing transistor, wherein a first electrode of the data writing transistor is electrically connected to a data line, and a second electrode of the data writing transistor is electrically connected to the second node;

a second reset circuit, comprising a third reset transistor, wherein a first electrode of the third reset transistor is electrically connected to a reset signal line, and a second electrode of the third reset transistor is electrically connected to the anode of to the light-emitting diode; and a light-emitting control circuit, comprising a first light-emitting control transistor and a second light-emitting control transistor, wherein a first electrode of the first light-emitting control transistor is electrically connected to a power signal line, a second electrode of the first light-emitting control transistor is electrically connected to the second node, a first electrode of the second light-emitting control transistor is electrically connected to the third node, and a second electrode of the second light-emitting control transistor is electrically connected to the anode of the light-emitting diode.

* * * * *